US012703208B2

(12) United States Patent
Oh et al.

(10) Patent No.: US 12,703,208 B2
(45) Date of Patent: Aug. 11, 2026

(54) THERMAL MONITORING OF TRAILERS

(71) Applicant: Hyundai Translead, San Diego, CA (US)

(72) Inventors: James Sangyoung Oh, Irvine, CA (US); Michael James Proulx, Hampstead, NH (US); Tong Pil Suh, Northville, MI (US)

(73) Assignee: Hyundai Translead, San Diego, CA (US)

( * ) Notice: Subject to any disclaimer, the term of this patent is extended or adjusted under 35 U.S.C. 154(b) by 0 days.

(21) Appl. No.: 18/363,297

(22) Filed: Aug. 1, 2023

(65) Prior Publication Data

US 2023/0373255 A1 Nov. 23, 2023

Related U.S. Application Data

(63) Continuation-in-part of application No. 17/383,244, filed on Jul. 22, 2021, now Pat. No. 11,845,461.

(60) Provisional application No. 63/055,131, filed on Jul. 22, 2020.

(51) Int. Cl.

| | |
|---|---|
| ***B60C 23/00*** | (2006.01) |
| ***B60C 23/04*** | (2006.01) |
| ***B60C 23/20*** | (2006.01) |
| ***B60T 17/22*** | (2006.01) |

(52) U.S. Cl.

CPC ........ *B60C 23/009* (2013.01); *B60C 23/0401* (2013.01); *B60C 23/0474* (2013.01); *B60C 23/0476* (2013.01); *B60C 23/0483* (2013.01); *B60C 23/20* (2013.01); *B60T 17/22* (2013.01)

(58) Field of Classification Search

None

See application file for complete search history.

(56) References Cited

U.S. PATENT DOCUMENTS 4,884,593 A * 12/1989 Chen .................. B60C 23/0496 137/227
5,825,286 A * 10/1998 Coulthard ............. G07C 5/008 340/447
5,895,846 A * 4/1999 Chamussy .......... B60C 23/0474 73/146.2
6,294,989 B1 * 9/2001 Schofield ............... B60K 35/80 340/442
6,445,286 B1 * 9/2002 Kessler ............... B60C 23/0408 340/447

(Continued)

FOREIGN PATENT DOCUMENTS

CA 3039675 A1 * 4/2018 .......... G01M 17/007
CA 3044009 A1 * 11/2019 ............ B60T 17/221

(Continued)

*Primary Examiner* — Kevin R Steckbauer

(74) *Attorney, Agent, or Firm* — Knobbe, Martens, Olson & Bear, LLP

(57) ABSTRACT

Monitoring a critical parameter of a trailer and issuing a severity warning including: monitoring the critical parameter to be within one of a plurality of bands and issuing a different level of the severity warning based on which band of the plurality of bands the critical parameter falls into, wherein the critical parameter includes at least one of tire pressure, tire temperature, and brake temperature; and increasing an alert level of the severity warning by one, every hour, when the monitored critical parameter indicates continuous increase or decrease over time.

10 Claims, 18 Drawing Sheets

(56) References Cited

U.S. PATENT DOCUMENTS

| | | | | |
|---|---|---|---|---|
| 6,472,979 | B2 * | 10/2002 | Schofield | B60K 35/28 340/447 |
| 6,680,672 | B2 * | 1/2004 | Borugian | F16D 66/021 73/115.07 |
| 6,774,774 | B2 * | 8/2004 | Schofield | B60C 23/00 340/447 |
| 6,868,358 | B2 * | 3/2005 | Brown, Jr. | B60C 23/0408 73/146 |
| 6,888,450 | B2 * | 5/2005 | Sasaki | B60C 23/0408 340/447 |
| 6,892,778 | B2 * | 5/2005 | Hennig | B60C 23/02 301/124.1 |
| 6,900,725 | B1 * | 5/2005 | Berry | B60C 23/0408 340/447 |
| 6,907,776 | B2 * | 6/2005 | Fischer | B60C 23/0408 73/146 |
| 7,075,417 | B2 * | 7/2006 | Harada | B60C 23/0408 340/447 |
| 7,075,421 | B1 * | 7/2006 | Tuttle | B60C 23/0498 340/447 |
| 7,218,209 | B2 * | 5/2007 | Utter | B60C 23/0408 340/447 |
| 7,218,210 | B2 * | 5/2007 | Schoenberger | B60C 23/0408 73/146 |
| 7,461,713 | B2 * | 12/2008 | Kojima | B60C 23/0408 180/277 |
| 7,667,583 | B2 * | 2/2010 | Petrucelli | B60C 23/0496 340/447 |
| 7,889,064 | B2 * | 2/2011 | Petrucelli | B60C 23/0408 340/447 |
| 8,823,505 | B2 * | 9/2014 | Maekawa | B60C 23/0408 73/146.2 |
| 9,079,461 | B2 * | 7/2015 | Suh | B60C 23/0479 |
| 9,409,450 | B2 * | 8/2016 | Dean | B60C 23/00354 |
| 9,796,220 | B2 * | 10/2017 | Graf | B60C 23/0476 |
| 9,947,151 | B2 * | 4/2018 | Ellis | B60C 5/005 |
| 10,086,662 | B2 * | 10/2018 | Graf | B60C 23/0476 |
| 10,186,091 | B2 * | 1/2019 | Ellis | G07C 5/0825 |
| 10,359,331 | B2 * | 7/2019 | McIntyre | G01L 17/00 |
| 10,486,476 | B2 * | 11/2019 | Patel | B60C 23/0405 |
| 10,841,127 | B1 * | 11/2020 | Greer | H04L 12/40013 |
| 11,298,987 | B2 * | 4/2022 | Kona | B60C 23/00372 |
| 11,298,992 | B2 * | 4/2022 | Lancu | B60C 23/20 |
| 11,302,120 | B2 * | 4/2022 | Hößle | G07C 5/0816 |
| 11,383,689 | B2 * | 7/2022 | Engelbert | B60T 17/22 |
| 11,872,851 | B2 * | 1/2024 | Kona | B60C 23/00372 |
| 11,917,934 | B2 * | 3/2024 | Kurata | B60W 50/029 |
| 2001/0026218 | A1 * | 10/2001 | Schofield | B60K 35/10 340/442 |
| 2002/0104717 | A1 * | 8/2002 | Borugian | F16D 66/021 188/1.11 E |
| 2002/0130771 | A1 * | 9/2002 | Osborne | B60C 23/008 340/441 |
| 2003/0058090 | A1 * | 3/2003 | Schofield | B60Q 1/54 340/425.5 |
| 2003/0070477 | A1 * | 4/2003 | Fischer | B60C 23/0408 73/146 |
| 2004/0017289 | A1 * | 1/2004 | Brown, Jr. | B60C 23/0408 340/442 |
| 2004/0021561 | A1 * | 2/2004 | Sasaki | B60C 23/0401 340/445 |
| 2004/0233049 | A1 * | 11/2004 | Harada | B60C 23/0408 340/442 |
| 2005/0052074 | A1 * | 3/2005 | Hennig | B61K 9/04 301/124.1 |
| 2005/0162263 | A1 * | 7/2005 | Fennel | B60C 23/0408 73/146 |
| 2005/0199328 | A1 * | 9/2005 | Schoenberger | B60C 23/0405 152/415 |
| 2006/0010961 | A1 * | 1/2006 | Gibson | B60C 23/0408 73/146 |
| 2006/0015225 | A1 * | 1/2006 | McQuade | B60C 23/0408 701/32.9 |
| 2006/0220813 | A1 * | 10/2006 | Utter | B60C 23/0408 73/146 |
| 2007/0069877 | A1 * | 3/2007 | Fogelstrom | B60C 23/005 340/442 |
| 2008/0042817 | A1 * | 2/2008 | Fogelstrom | B60C 23/009 340/442 |
| 2008/0084002 | A1 * | 4/2008 | Raben | B29D 30/54 425/29 |
| 2010/0109857 | A1 * | 5/2010 | Bennie | B60C 23/0408 340/447 |
| 2014/0245825 | A1 * | 9/2014 | McIntyre | G01L 17/00 73/146.3 |
| 2014/0277910 | A1 * | 9/2014 | Suh | B60C 23/0476 701/33.9 |
| 2015/0029015 | A1 * | 1/2015 | Pierce | B60C 23/00372 340/442 |
| 2015/0091720 | A1 * | 4/2015 | Graf | B60C 23/0476 340/443 |
| 2015/0101702 | A1 * | 4/2015 | Dean | B60C 23/00372 141/4 |
| 2017/0120703 | A1 * | 5/2017 | Andrews | B60C 25/0557 |
| 2017/0166020 | A1 * | 6/2017 | Shin | B60C 23/0486 |
| 2017/0206720 | A1 * | 7/2017 | Ellis | B60B 3/165 |
| 2018/0015792 | A1 * | 1/2018 | Graf | B60C 23/0476 |
| 2018/0232966 | A1 * | 8/2018 | Ellis | G07C 5/006 |
| 2019/0118589 | A1 * | 4/2019 | Patel | B60C 23/0471 |
| 2019/0359196 | A1 * | 11/2019 | Engelbert | B60T 17/22 |
| 2020/0324585 | A1 * | 10/2020 | Kona | B60C 23/0479 |
| 2020/0366520 | A1 * | 11/2020 | Greer | H04W 4/40 |
| 2022/0001707 | A1 * | 1/2022 | Lancu | B60C 23/20 |
| 2022/0024477 | A1 * | 1/2022 | Lee | B62D 63/08 |
| 2022/0036664 | A1 * | 2/2022 | Jankowski | B62D 53/06 |
| 2022/0176753 | A1 * | 6/2022 | Kona | B60C 23/002 |
| 2022/0176758 | A1 * | 6/2022 | Degenhardt | B60C 23/0479 |
| 2022/0192075 | A1 * | 6/2022 | Kurata | A01B 69/006 |
| 2022/0221016 | A1 * | 7/2022 | Sienkiewicz | B60T 17/221 |
| 2022/0225064 | A1 * | 7/2022 | Greer | B60T 17/221 |
| 2022/0415100 | A1 * | 12/2022 | Hartmann | G07C 5/0808 |
| 2023/0044053 | A1 * | 2/2023 | Moetteli | B60C 23/10 |
| 2023/0234548 | A1 | 7/2023 | Suh et al. | |
| 2023/0373255 | A1 * | 11/2023 | Oh | B60C 23/0476 |
| 2024/0217275 | A1 * | 7/2024 | Dudar | B60C 23/0484 |

FOREIGN PATENT DOCUMENTS

| | | | | | |
|---|---|---|---|---|---|
| CA | 3125657 | A1 | * | 1/2022 | B60K 28/10 |
| CN | 204354736 | U | * | 5/2015 | B60C 23/0477 |
| CN | 106314414 | A | * | 1/2017 | B60T 17/22 |
| CN | 103373185 | B | * | 4/2017 | B60C 23/0477 |
| CN | 207649913 | U | * | 7/2018 | |
| CN | 109591522 | A | * | 4/2019 | B60Q 9/00 |
| CN | 109591522 | B | * | 12/2020 | B60C 23/04 |
| CN | 116766838 | A | * | 9/2023 | B60C 23/0488 |
| CN | 118683242 | A | * | 9/2024 | B60C 23/16 |
| CN | 118769771 | A | * | 10/2024 | B60C 23/20 |
| DE | 102014203836 | A1 | * | 9/2014 | B60C 23/0477 |
| DE | 102015115917 | A1 | * | 3/2017 | B60C 23/0454 |
| DE | 102019112481 | A1 | * | 10/2020 | B60C 23/008 |
| DE | 102019133172 | A1 | * | 6/2021 | G07C 5/0816 |
| EP | 3325290 | B1 | * | 10/2019 | B60C 23/0454 |
| EP | 3978278 | A1 | * | 4/2022 | B60C 23/0476 |
| JP | 2018024362 | A | * | 2/2018 | B60C 23/00 |
| WO | WO-2017050513 | A1 | * | 3/2017 | B60C 23/0454 |
| WO | WO-2018029944 | A1 | * | 2/2018 | B60C 23/04 |
| WO | WO-2020236392 | A1 | * | 11/2020 | F16D 66/00 |
| WO | WO-2024246906 | A1 | * | 12/2024 | B60C 19/00 |

* cited by examiner

Tire Temperature
Level 1
800

Brake Temperature
Level 2 - Level 4
1300

| | TEMPS LEVEL 1 | TEMPS LEVEL 2 | TEMPS LEVEL 3 | TEMPS LEVEL 4 | TEMPS LEVEL 5 |
|---|---|---|---|---|---|
| 1510 | Warnings and Alerts for real-time driving of a trailer for thermal-related events | | | Maintenance and Equipment Inspection Alert and warnings | Predictive warnings for locations that have had historical high temperatures |
| | Sensor Threshold Warnings | Refined sensor data to improve accuracy and reduce false positives | | Predictive Warning alerts and real-time road condition alerts that would affect the temperature of the brakes | |
| | Single Trailer Related Data | | | Historical and Grouped Datasets | |
| 1520 | Single Sensor Values | Single Sensor + Speed/Time | Single Sensor + Speed/Time + Environmental | Vehicle History | Geographical Data |
| 1530 | - Tire Temp warning<br>- Low air Pressure Alert | - Parking Brake on while driving alert<br>- Brake pad extreme rise alert | - Service brake engaged too long<br>- Suspected air leak in rear outer tire | - Front left inner brake pad runs hotter than normal | - Caution area ahead has high volume of thermal events |

THERMAL MONITORING OF TRAILERS

CROSS-REFERENCE TO RELATED APPLICATIONS

The present application is a continuation-in-part application of co-pending U.S. patent application Ser. No. 17/383,244 (filed Jul. 22, 2021; entitled "Thermal Monitoring System for Trailer Wheel Area"). The disclosure of the above-referenced patent application is incorporated herein by reference.

BACKGROUND

Field of the Invention

The present disclosure relates generally to trailers, and more specifically, to thermal monitoring of the trailers.

Background

During the operation of a trailer, thermal events such as fire can occur due to several different causes. For example, brake dragging may cause overheating at the brake pad and/or brake drum. In another example, less than normal amount of lubricant (e.g., oil or grease) may cause overheating in the drum. In another example, use of wrong air valves may cause tire and/or brake dragging. In another example, excessive or low tire pressure may cause overheating of tires and/or wheels. Normal operating temperatures for tires and wheels are between 100 and 150° F. Temperatures between 200 and 300° F. may impact other vehicle components, temperatures between 500 and 550° F. may cause flammable vapors to start to form, and temperatures between 650 and 700° F. may cause burning fires that are difficult to extinguish.

In many cases, the impact of the thermal event may result in a total destruction of the trailer, and the trailer may be burnt too badly to determine the root cause of the event. The thermal event may also cause an accident and pose a danger to the driver and to the passengers of the other vehicles. Further, the thermal event may result in a large financial burden to the owner of the trailer. Accordingly, monitoring key components and alerting the driver and the owner of the trailer is essential.

SUMMARY

The present disclosure describes thermal monitoring of key components of a trailer and alerting the driver and the owner of the trailer when the readings of the thermal monitors are within certain levels.

In one implementation, a method for monitoring a critical parameter of a trailer and issuing a severity warning are disclosed. The method includes: monitoring the critical parameter to be within one of a plurality of bands and issuing a different level of the severity warning based on which band of the plurality of bands the critical parameter falls into, wherein the critical parameter includes at least one of tire pressure, tire temperature, and brake temperature; and increasing an alert level of the severity warning by one, every hour, when the monitored critical parameter indicates continuous increase or decrease over time.

Other features and advantages of the present disclosure should be apparent from the present description which illustrates, by way of example, aspects of the present disclosure.

BRIEF DESCRIPTION OF THE DRAWINGS

The details of the present disclosure, both as to its structure and operation, may be gleaned in part by study of the appended drawings, in which like reference numerals refer to like parts, and in which:

FIG. 15 is a table showing warnings and alerts for different levels of a thermal event monitoring and predictive system in accordance with one implementation of the present disclosure.

DETAILED DESCRIPTION

Figure 1A:
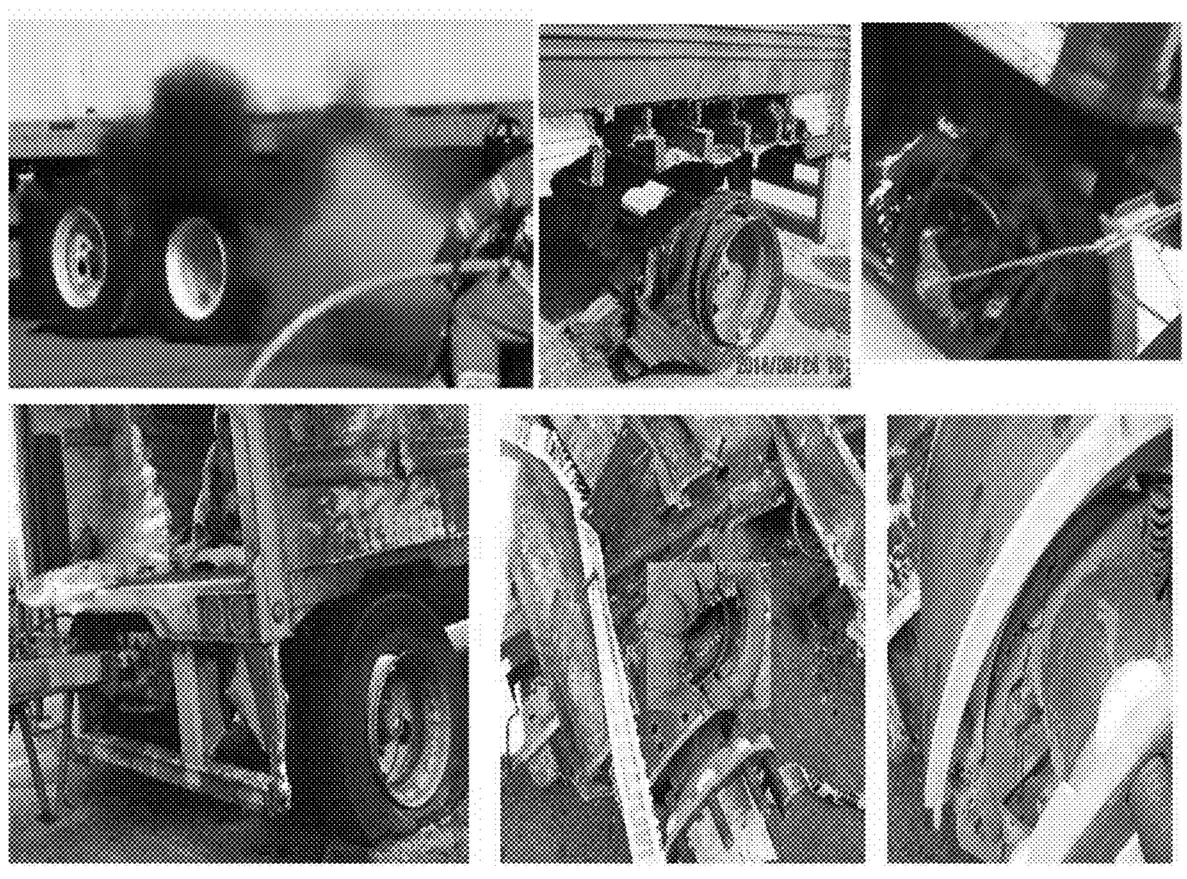
FIG. 1A shows pictures of damages to the tire, wheel end, and/or brake area caused by the thermal events.

Thermal events in the tire, wheel end, and/or brake area can generate severe overheating and may lead to a fire that can cause accident or destruction of the trailer and pose a danger to the driver and to the passengers of the other vehicles. FIG. 1A shows pictures of damages to the tire, wheel end, and/or brake area caused by the thermal events.

Figure 1B:
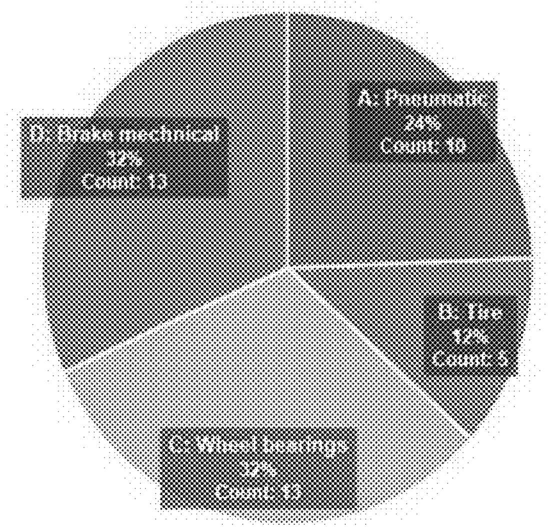
FIG. 1B shows statistics for the thermal event caused by different failures.

As described above, the thermal events may be caused by several different failures including: brake dragging which may cause overheating at the brake pad and/or brake drum; less than normal amount of lubricant (e.g., oil or grease) which may cause overheating in the drum; use of wrong air valves which may cause tire and/or brake dragging; and excessive or low tire pressure which may cause overheating of tires and/or wheels. FIG. 1B shows statistics for the thermal event caused by different failures. For example, the statistics show that: 24% of the thermal event is caused by the pneumatic failure, 12% of the thermal event is caused by the tire failure, 32% of the thermal event is caused by the wheel bearing failure, and 32% of the thermal event is caused by the brake mechanical failure. Current solutions to address the causes of the thermal events include regular maintenance inspection check and scheduled replacement of certain components. However, these solutions do not provide active warning or monitoring, and thus, may be inadequate to provide protection from the thermal events.

Therefore, to address the issues involved with the thermal events, certain implementations of the present disclosure provide for systems and methods to monitor critical areas for possible excessive heating, to alert the driver, to inform the fleet headquarter of the failures, and to take any necessary actions to limit the damage to the trailer. Implementations also provide for thermal monitoring of key components and alerting the driver and the owner of the trailer when the readings of the thermal monitors are within certain levels.

Accordingly, after reading this description it will become apparent how to implement the present disclosure in various implementations and applications. Although various implementations of the present disclosure will be described herein, it is understood that these implementations are presented by way of example only, and not limitation. As such, this detailed description of various implementations should not be construed to limit the scope or breadth of the present disclosure.

Figure 2A:
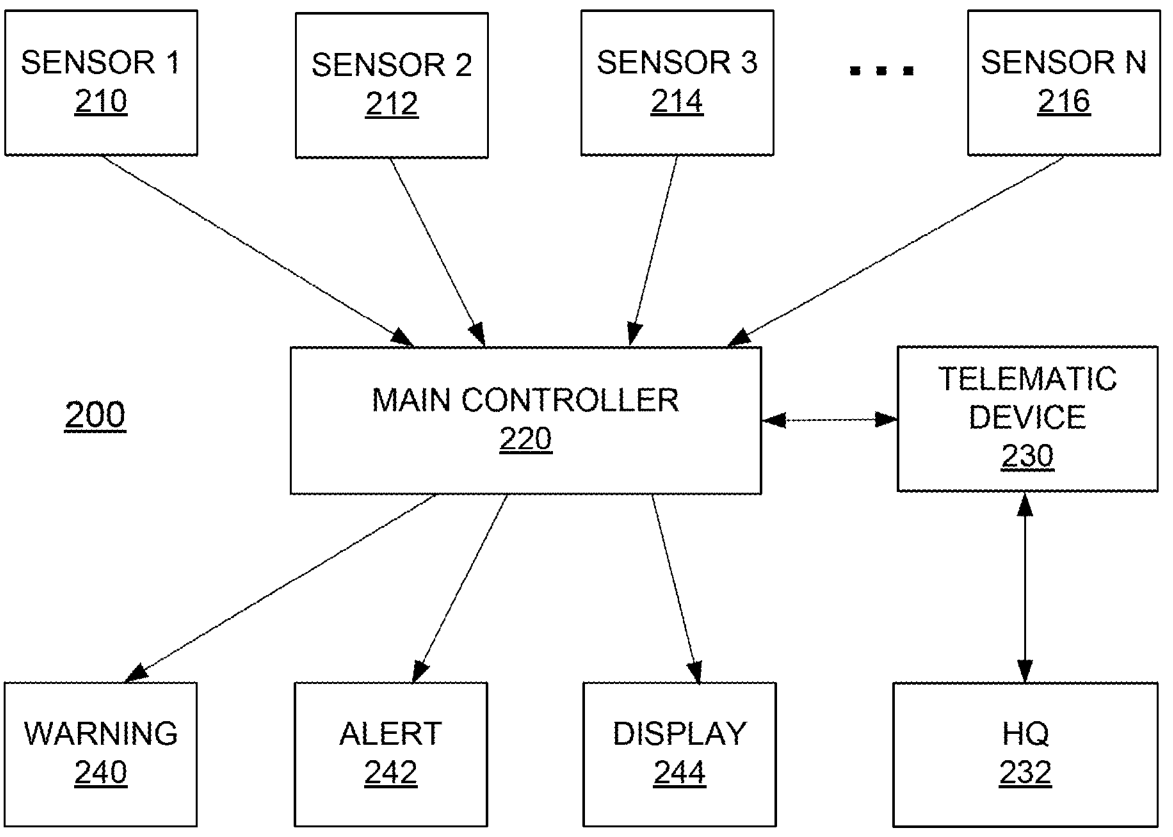
FIG. 2A is a block diagram of a system to monitor critical areas of a trailer for thermal events in accordance with one implementation of the present disclosure.

FIG. 2A is a block diagram of a system 200 to monitor critical areas of a trailer for thermal events in accordance with one implementation of the present disclosure. The system 200 is configured to monitor the critical areas for possible excessive heating, to alert the driver, to inform the fleet headquarter of the failures, and to take any necessary actions to limit the damage to the trailer. In one implementation, the system 200 is configured to recognize the fact that the cause of failures is independent to each area, but the result is correlated. That is, the heat generated from each area can quickly transfer over to other areas nearby and lead to thermal events.

In the illustrated implementation of FIG. 2A, the system 200 includes a plurality of sensors 210, 212, 214, 216 placed at or near the critical areas, a main controller 220, a telematic device 230 to communicate the failures to the fleet headquarter 232, and a warning device 240, an alert device 242, and a display 244 to alert the driver.

In the illustrated implementation of FIG. 2A, the plurality of sensors 210, 212, 214, 216 measure temperature changes in critical areas including but not limited to tire, brake, and/or wheel end. The sensors 210, 212, 214, 216 then transmit the measured sensor data to the main controller 220 via wire or wireless communication.

In the illustrated implementation of FIG. 2A, the main controller 220 monitors incoming sensor data from the sensors 210, 212, 214, 216 and triggers alerts 242 and/or warnings 240. In one implementation, the main controller 220 turns on indicator light and/or alarm sound to the driver when the temperature changes are detected to be above pre-defined thresholds. In another implementation, the main controller 220 also displays the status on the display 244. In a further implementation, the main controller 220 sends the sensor data and the alerts and/or warnings to the headquarter 232 using the telematics device 230.

Figure 2B:
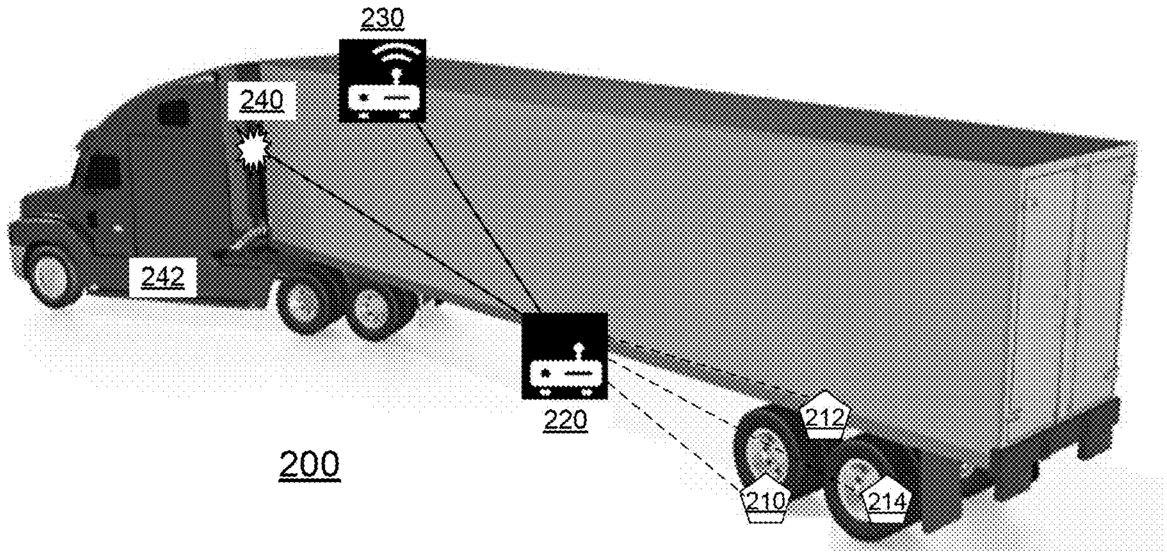
FIG. 2B shows components of the system which are installed in the trailer in accordance with one implementation of the present disclosure.

FIG. 2B shows components of the system 200 which are installed in the trailer in accordance with one implementation of the present disclosure. FIG. 2B shows sensors 210, 212, 214 installed to measure temperature changes in critical areas including the tire 212, the brake 210, and the wheel end 214. Although FIG. 2B only shows the sensors installed on the tire 212, the brake 210, and the wheel end 214, other sensors may be installed in other critical areas such as wheel axles. In FIG. 2B, the sensors 210, 212, 214 then transmit the measured sensor data to the main controller 220 via wire or wireless communication. In one implementation, the main controller 220 is located in the trailer. In another implementation, the main controller 220 is located in the cab 242.

In FIG. 2B, the main controller 220 monitors incoming sensor data from the sensors 210, 212, 214 and triggers alerts and/or warnings 240. In one implementation, the main controller 220 turns on indicator light and/or alarm sound to the driver when the temperature changes are detected to be above pre-defined thresholds. In another implementation, the main controller 220 also displays the status on the display. In a further implementation, the main controller 220 sends the sensor data and the alerts and/or warnings to the headquarter using the telematics device 230. In one implementation, the telematics device 230 is located in the trailer. In another implementation, the telematics device 230 is located in the cab 242.

Figure 2C:
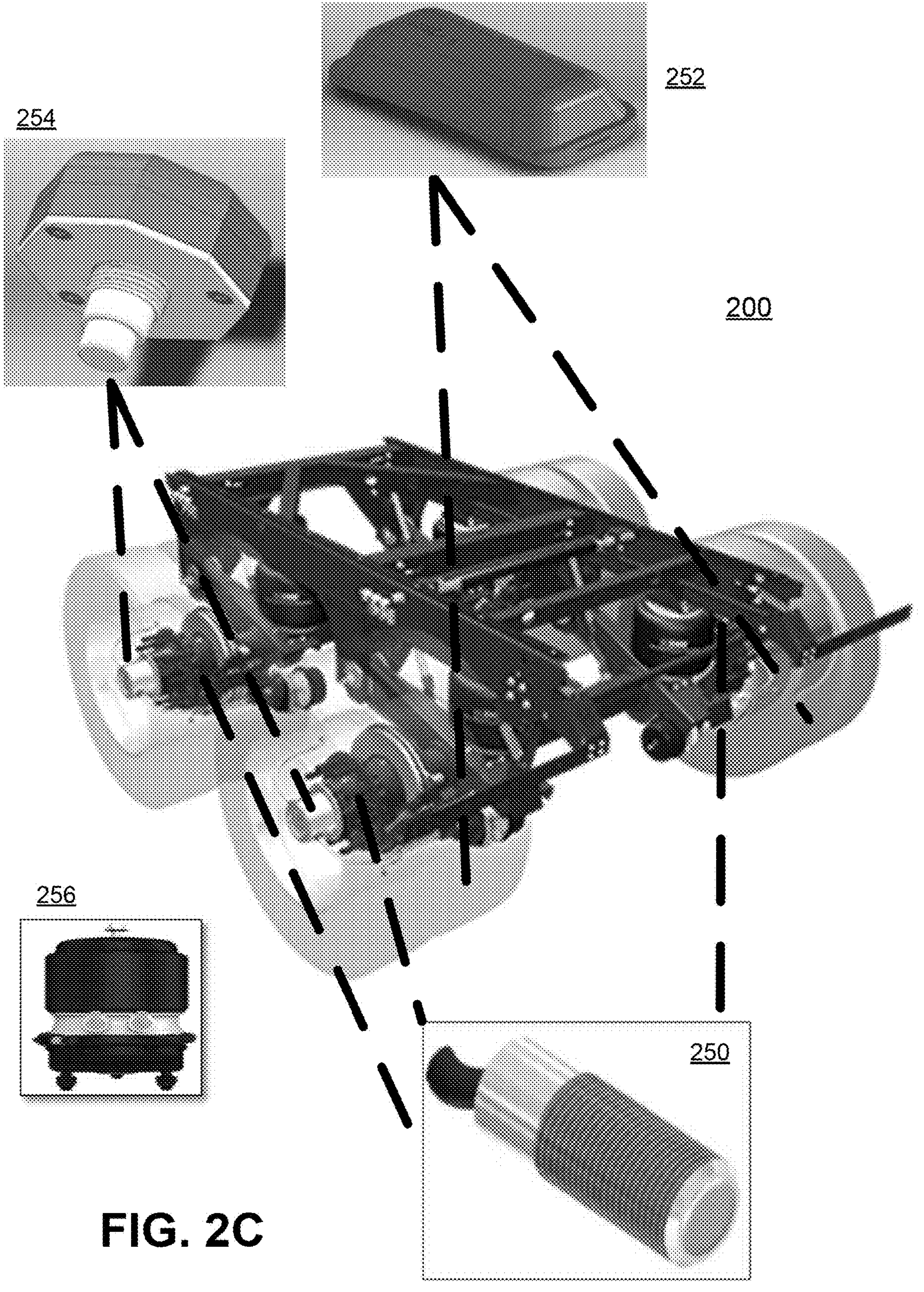
FIG. 2C shows detailed illustration of sensors of the system installed in the trailer in accordance with one implementation of the present disclosure.

FIG. 2C shows detailed illustration of sensors of the system 200 installed in the trailer in accordance with one implementation of the present disclosure. In the illustrated implementation of FIG. 2C, the sensors include a brake temperature sensor 250, a tire pressure monitoring sensor 252, a wheel end sensor 254, and an air brake chamber sensor 256. In one implementation, the brake temperature sensor 250 is installed on each brake. In another implementation, the tire pressure monitoring sensor 252 is installed in all tires. In another implementation, the wheel end sensor 254 is installed on all wheel ends. In another implementation, the air brake chamber sensor 256 is installed on all wheel ends. The air brake chamber sensor 256 is an air pressure sensor that measures air pressure on the brake chamber to determine whether the brake is engaged or disengaged. In heavy duty trucks and trailers, the brakes are operated by air pressure. Damages and/or defects on the air hose and/or the air brake system can cause the brakes to not disengage fully (referred to as brake dragging), which may cause overheating and fire. By having the air pressure monitor sensor on the air brake chamber, the brake dragging can be detected and the driver and/or the dispatcher may be alerted. Although FIG. 2C only shows the sensors 250, 252, 254, 256 installed on the brake, the tire, and the wheel end, respectively, other sensors may be installed in other critical areas.

In one implementation, the system 200 is a system configured entirely with hardware including one or more digital signal processors (DSPs), general purpose microprocessors, application specific integrated circuits (ASICs), field programmable gate/logic arrays (FPGAs), or other equivalent integrated or discrete logic circuitry. In another implementation, the system 200 is configured with a combination of hardware and software. For example, the telematic device 230 is configured with hardware, while the functions of the main controller 220 are configured as software residing within a separate processor.

Figure 3:
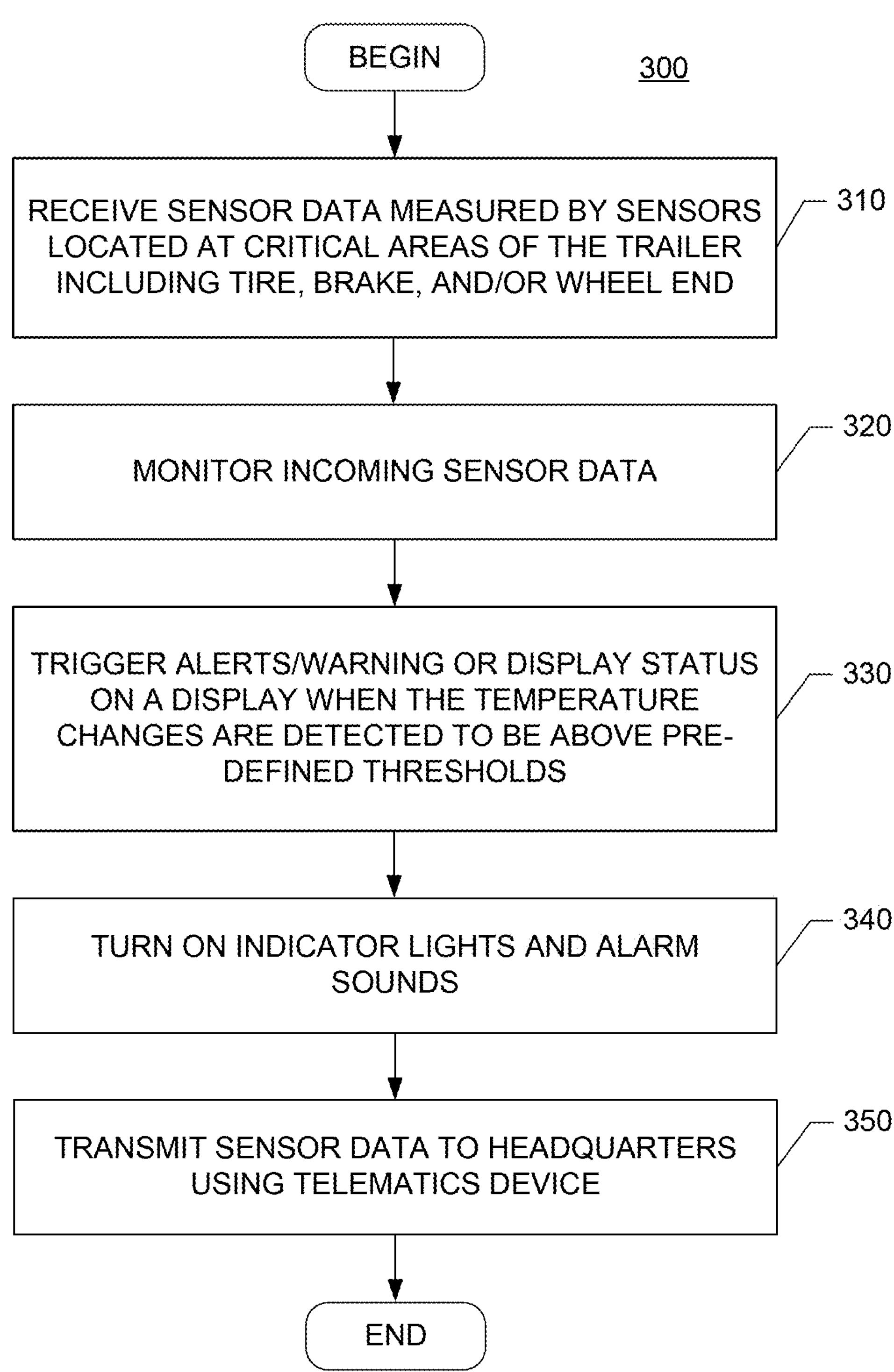
FIG. 3 is a flow diagram of a method to monitor critical areas for thermal events in accordance with one implementation of the present disclosure.

FIG. 3 is a flow diagram of a method 300 to monitor critical areas for thermal events in accordance with one implementation of the present disclosure. In the illustrated implementation of FIG. 3, the main controller receives sensor data, at step 310, measured by sensors located at critical areas of the trailer including tire, brake, and/or wheel end. The sensor data may include temperature changes. In one implementation, the sensor data is transmitted from the sensors to the main controller via wire communication. In another implementation, the sensor data is transmitted from the sensors to the main controller via wireless communication. The main controller monitors the incoming sensor data, at step 320.

In one implementation, the main controller triggers alerts and/or warnings or displays the status on a display, at step 330, when the temperature changes are detected to be above pre-defined thresholds. The main controller may also turn on, at step 340, indicator lights and/or alarm sounds to the driver. In one implementation, the main controller transmits the sensor data and the alerts/warnings to the headquarter, at step 350, using a telematics device.

In one implementation, benefits of the system and method to monitor critical areas for thermal events include the fact that: the driver can take necessary action before the events get out of control; the fleet can take necessary action to arrange for replacement parts or trailers; the total loss of the trailer and/or the cargo can be prevented, or, at least, minimized; the preventive maintenance and record keeping can be made; and the risks to other vehicles and the damages to the road and/or other properties can be prevented, or, at least, minimized.

FIG. 15 is a table 1500 showing warnings and alerts for different levels of a thermal event monitoring and predictive system (TEMPS) in accordance with one implementation of the present disclosure. Table 1500 represents the advancement/increased focus of alert algorithm. Level 1 starts with simple sensor value and warning thresholds, and gets more complicated moving up the level. Level 2 involves speed and time factor. Level 3 adds environmental factors such as weather, altitude, and GPS location. Level 4 uses a large sample set of similarly-configured trailers and conditions, and checks for outliers or anomalies. Level 5 uses road data (both current and past history) to provide better routing/navigation depending on current trailer status.

In FIG. 15, the first two rows 1510 identify what warnings and alerts a customer/driver would observe for each level, the third row 1520 identifies how the data would be used for each level, and the bottom row 1530 identifies some example warnings and alerts for each level.

For example, regarding first two rows 1510, levels 1 through 3 provide warnings and alerts for real-time driving of a trailer for thermal-related events. Specifically, level 1 warnings may include sensor threshold warning, while levels 2 and 3 warnings may include refined sensor data to improve accuracy and reduce false positives. Level 4 warning may provide maintenance and equipment inspection alert and warning, while level 5 warnings may provide predictive warnings for locations that have had historical high temperatures. In one implementation, levels 4 and 5 warnings may include predictive warning alerts and real-time road condition alerts that would affect the temperature of the brakes.

Regarding third row 1520 (identifying how the data would be used for each level), levels 1 through 3 may include single trailer related data, wherein level 1 includes single sensor values, level 2 includes single sensor values given speed/time data, and level 3 includes single sensor values given speed/time/environmental data. Further, levels 4 and 5 may include historical and grouped datasets, wherein level 4 includes vehicle history, while level 5 includes geographical data.

Regarding fourth row 1530 (identifying some example warnings and alerts for each level): level 1 may include tire temperature warnings and/or low air pressure alerts; level 2 may include 'parking brake on while driving' alert and/or 'brake pad extreme rise' alert; level 3 may include 'service brake engaged too long' warning and/or 'suspected air leak in rear out tire' warning; level 4 may include 'front left inner brake pad runs hotter than normal' warning; and level 5 may include 'caution area ahead—has high volume of thermal events' warning.

Figure 16:
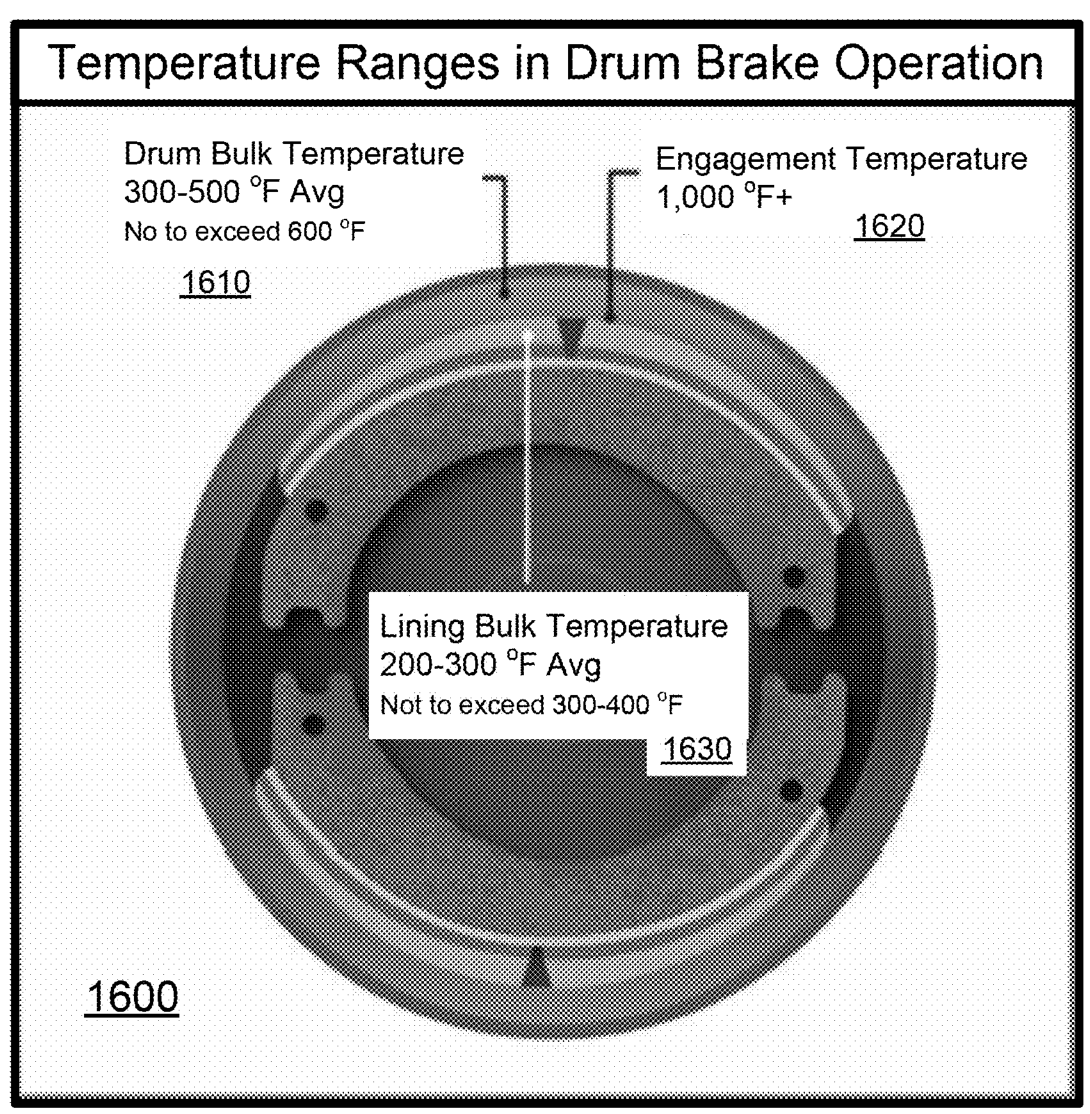
FIG. 16 is a cross section cut illustrating the operational temperature ranges for different sections of a drum brake in accordance with one implementation of the present disclosure.

FIG. 16 is a cross section cut illustrating the operational temperature ranges for different sections of a drum brake 1600 in accordance with one implementation of the present disclosure. FIG. 16 shows: the drum bulk temperature 1610 to be between 300 to 500° F. on average, not to exceed 600° F.; the engagement temperature 1620 to be more than 1000° F.; and the lining bulk temperature 1630 to be between 200 to 300° F. on average, not to exceed 300-400° F.

Figure 4:
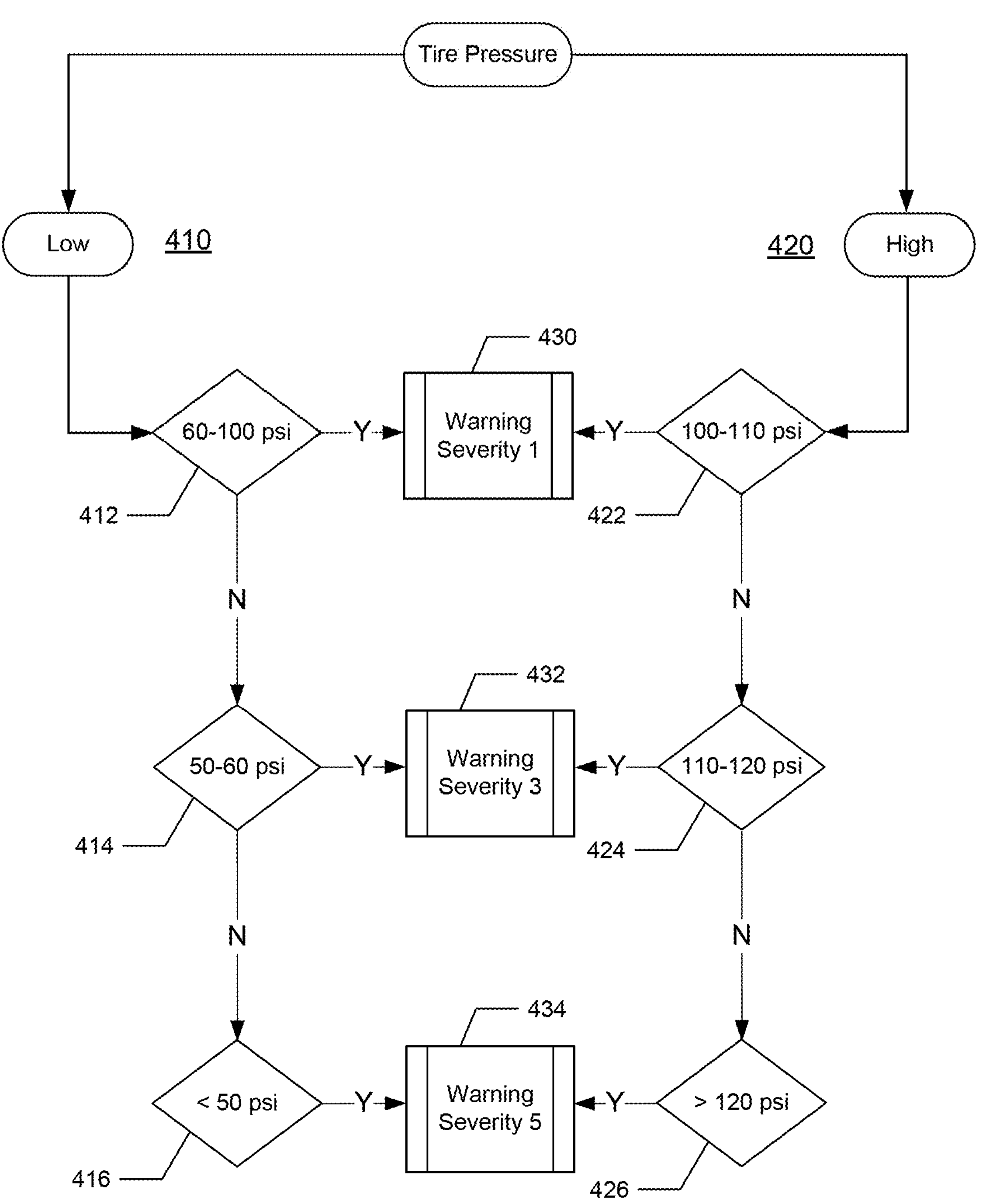
FIG. 4 is a flow diagram of a level 1 tire pressure monitoring process in accordance with one implementation of the present disclosure.

FIG. 4 is a flow diagram of a level 1 tire pressure monitoring process 400 in accordance with one implementation of the present disclosure. In the illustrated implementation of FIG. 4, the tire pressure is monitored for low tire pressure 410 or high tire pressure 420.

For low tire pressure 410: a pressure between 60 and 100 pounds-per-square-inch (psi) 412 generates warning severity 1 (430); a pressure between 50 and 60 psi 414 generates warning severity 3 (432); and a pressure less than 50 psi 416 generates warning severity 5 (434).

For high tire pressure 420: a pressure between 100 and 110 psi 422 generates warning severity 1 (430); a pressure between 110 and 120 psi 424 generates warning severity 3 (432); and a pressure greater than 120 psi 426 generates warning severity 5 (434).

Figure 5:
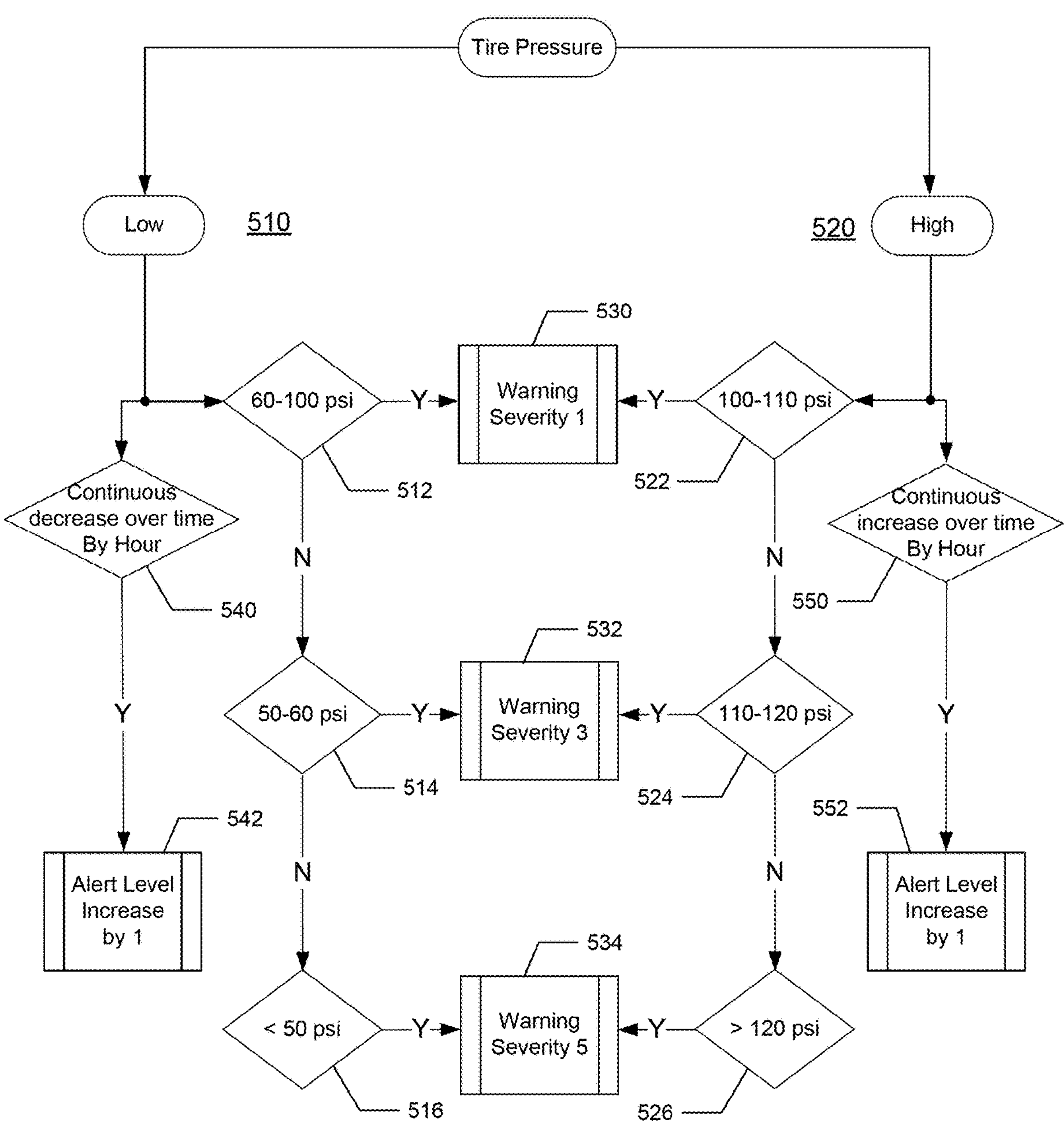
FIG. 5 is a flow diagram of a level 2 tire pressure monitoring process in accordance with one implementation of the present disclosure.

FIG. 5 is a flow diagram of a level 2 tire pressure monitoring process 500 in accordance with one implementation of the present disclosure. In the illustrated implementation of FIG. 5, the tire pressure is monitored for low tire pressure 510 or high tire pressure 520.

For low tire pressure 510: a pressure between 60 and 100 psi 512 generates warning severity 1 (530); a pressure between 50 and 60 psi 514 generates warning severity 3 (532); and a pressure less than 50 psi 516 generates warning severity 5 (534). Further, for low tire pressure 510 that shows continuous decrease over time 540, an alert level is increased by one 542, every hour. For example, small puncture on the tire from nail or foreign object may cause small continuous air leak. In another example, incorrect valve installation can cause improper seal and slow air leak overtime. In one example, the continuous decrease over time may encompass approximately 5 psi loss over 1 hour period.

For high tire pressure 520: a pressure between 100 and 110 psi 522 generates warning severity 1 (530); a pressure between 110 and 120 psi 524 generates warning severity 3 (532); and a pressure greater than 120 psi 526 generates warning severity 5 (534). Further, for high tire pressure 520 that shows continuous increase over time 550, an alert level is increased by one 552, every hour. In one example, the continuous increase over time may encompass approximately 5 psi gain over 1 hour period. In some cases, the high tire pressure may be cause by hot ambient temperature, driving over speed, excessive braking, and/or auto tire inflation system (ATIS) malfunction.

Figure 6:
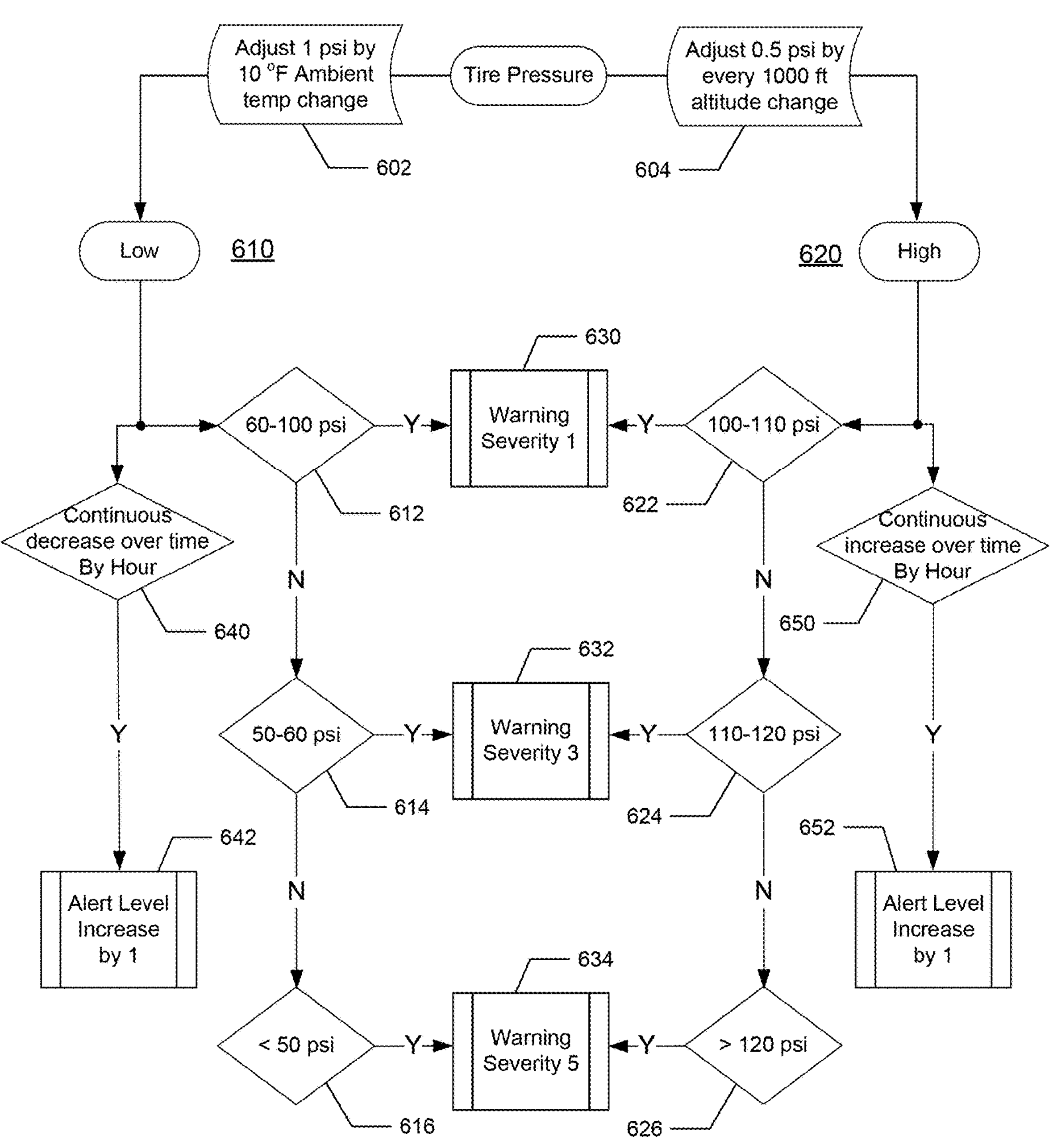
FIG. 6 is a flow diagram of a level 3 tire pressure monitoring process in accordance with one implementation of the present disclosure.

FIG. 6 is a flow diagram of a level 3 tire pressure monitoring process 600 in accordance with one implementation of the present disclosure. In the illustrated implementation of FIG. 6, the tire pressure is monitored for low tire pressure 610 or high tire pressure 620. Further, the tire pressure is adjusted 1 psi, at 602, by every 10° F. change in ambient temperature, while the tire pressure is adjusted 0.5 psi, at 604, by every 1,000 feet of change in altitude. That is, the tire pressure is increased or decreased depending on altitude and ambient temperature. The monitoring process 600 makes the necessary adjustments to keep accurate alert thresholds.

For low tire pressure 610: a pressure between 60 and 100 psi 612 generates warning severity 1 (630); a pressure between 50 and 60 psi 614 generates warning severity 3 (632); and a pressure less than 50 psi 616 generates warning severity 5 (634). Further, for low tire pressure 610 that shows continuous decrease over time 640, an alert level is increased by one 642, every hour.

For high tire pressure 620: a pressure between 100 and 110 psi 622 generates warning severity 1 (630); a pressure between 110 and 120 psi 624 generates warning severity 3 (632); and a pressure greater than 120 psi 626 generates warning severity 5 (634). Further, for high tire pressure 620 that shows continuous increase over time 650, an alert level is increased by one 652, every hour.

Figure 7:
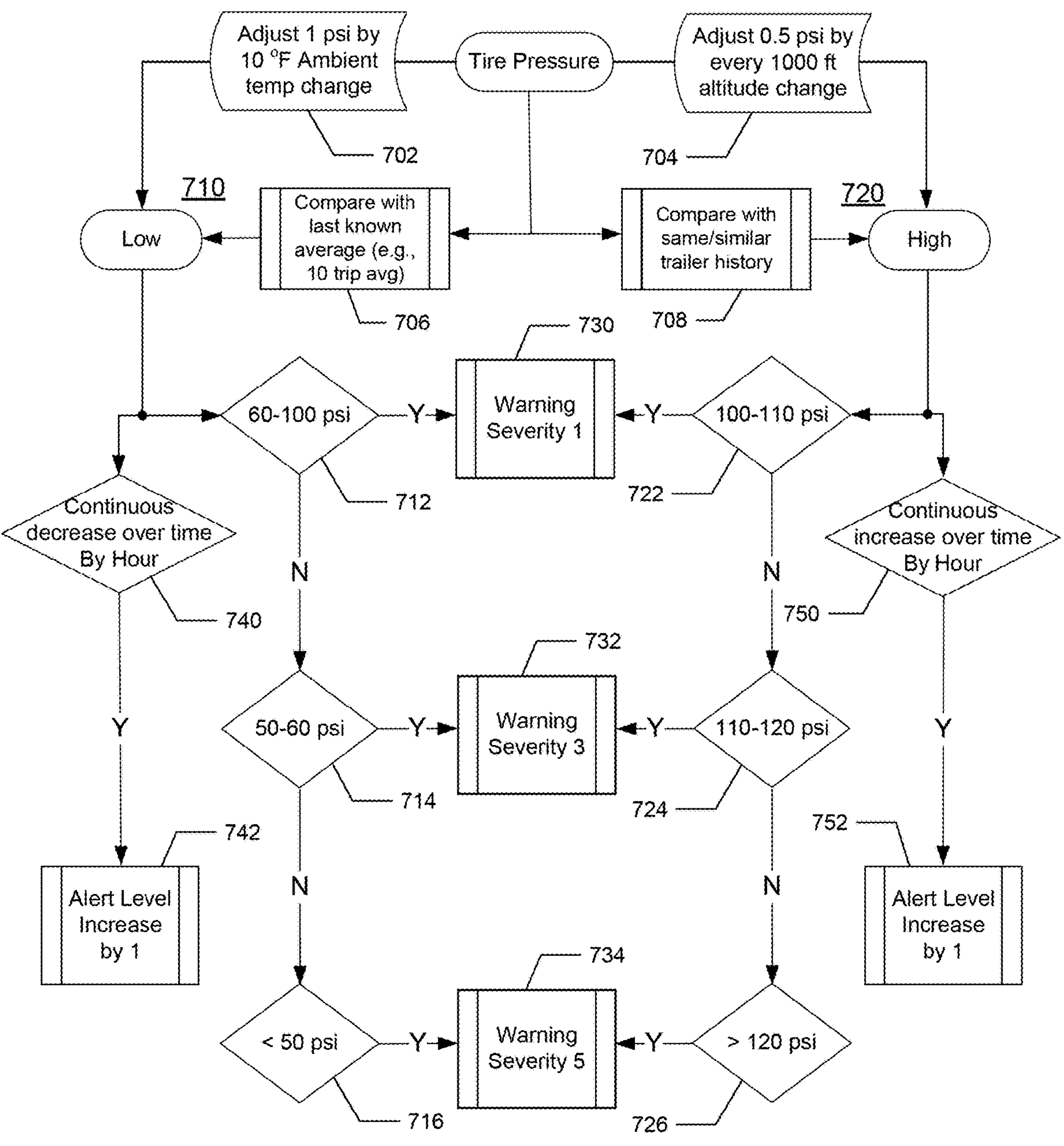
FIG. 7 is a flow diagram of a level 4 tire pressure monitoring process in accordance with one implementation of the present disclosure.

FIG. 7 is a flow diagram of a level 4 tire pressure monitoring process 700 in accordance with one implementation of the present disclosure. In the illustrated implementation of FIG. 7, the tire pressure is monitored for low tire pressure 710 or high tire pressure 720. In one implementation, the tire pressure is also adjusted 1 psi, at 702, by every 10° F. change in ambient temperature, while the tire pressure is adjusted 0.5 psi, at 704, by every 1,000 feet of change in altitude. Further, the tire pressure is compared with an average of the last known average tire pressure (e.g., average of the last 10 trips), at 706, and is compared with a set number of trips taken by the same or similar trailer (i.e., the trip history), at 708. Thus, comparing the tire pressure with the previous trip history of similarly-configured trailer(s) provides pre-alerts and recommendations to prevent failures or breakdown. For example, if a trailer is entering into a mountain range and one of the critical components is nearing the alert threshold, the system may compare the previous trip history and/or other similarly-configured vehicle history to determine the effects of going up/down the mountain range. Further, the history data may be used to predict whether the trailer may soon exceed the threshold and be in danger. In such a case, the system may issue pre-alert(s) to the driver to take necessary precaution.

For low tire pressure 710: a pressure between 60 and 100 psi 712 generates warning severity 1 (730); a pressure between 50 and 60 psi 714 generates warning severity 3 (732); and a pressure less than 50 psi 716 generates warning severity 5 (734). Further, for low tire pressure 710 that shows continuous decrease over time 740, an alert level is increased by one 742, every hour.

For high tire pressure 720: a pressure between 100 and 110 psi 722 generates warning severity 1 (730); a pressure between 110 and 120 psi 724 generates warning severity 3 (732); and a pressure greater than 120 psi 726 generates warning severity 5 (734). Further, for high tire pressure 720 that shows continuous increase over time 750, an alert level is increased by one 752, every hour.

Figure 8:
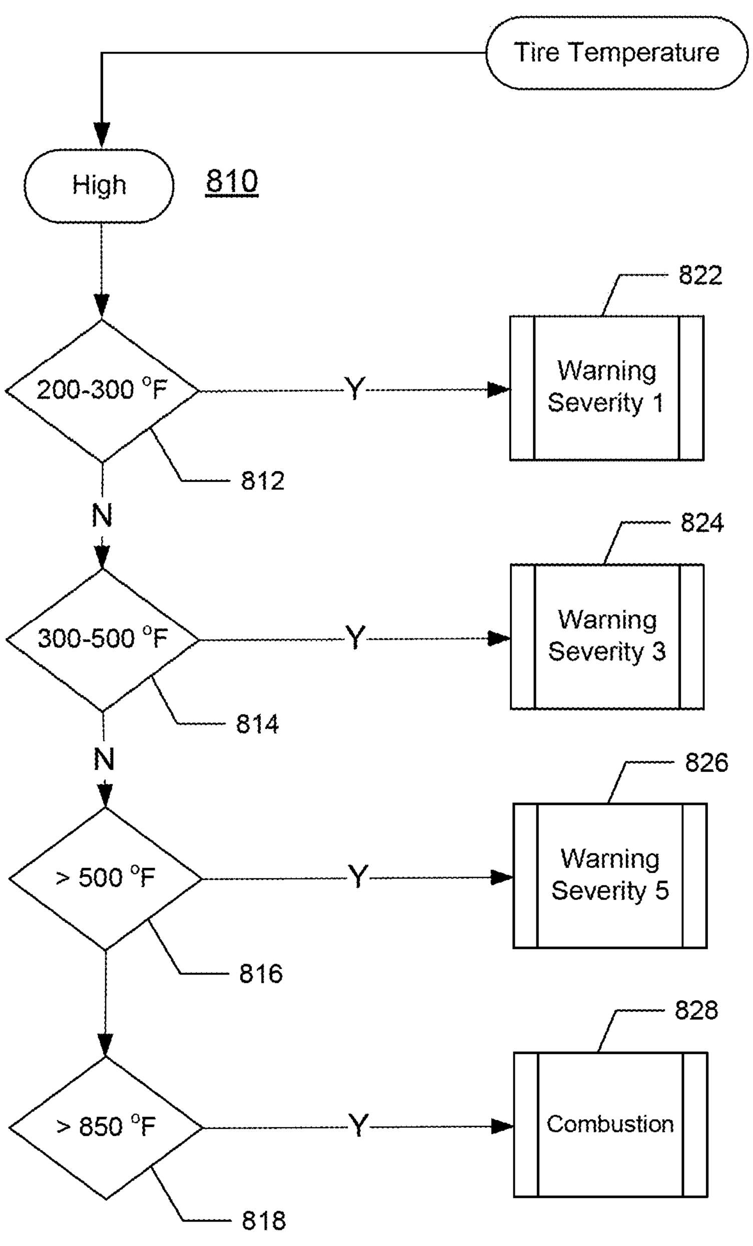
FIG. 8 is a flow diagram of a level 1 tire temperature monitoring process in accordance with one implementation of the present disclosure.

FIG. 8 is a flow diagram of a level 1 tire temperature monitoring process 800 in accordance with one implementation of the present disclosure. In the illustrated implementation of FIG. 8, the tire temperature is monitored for high tire temperature 810.

For high tire temperature 810: a temperature between 200 and 300° F. 812 generates warning severity 1 (822); a temperature between 300 and 500° F. 814 generates warning severity 3 (824); a temperature greater than 500° F. 816 generates warning severity 5 (826); and a temperature greater than 850° F. 818 generates a combustion warning (828).

Figure 9:
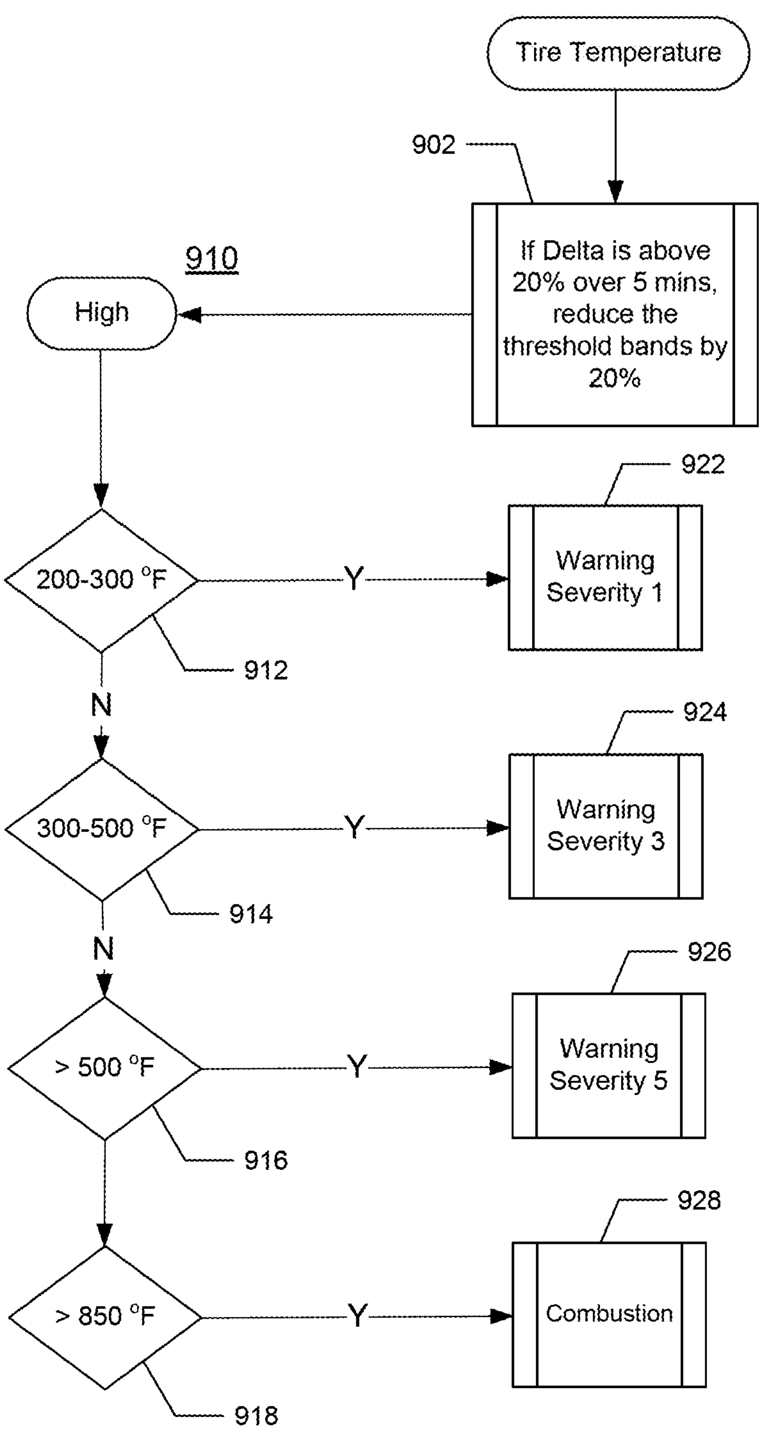
FIG. 9 is a flow diagram of levels 2 and 3 tire temperature monitoring process in accordance with one implementation of the present disclosure.

FIG. 9 is a flow diagram of levels 2 and 3 tire temperature monitoring process 900 in accordance with one implementation of the present disclosure. In the illustrated implementation of FIG. 9, the tire temperature is monitored for high tire temperature 910. Further, if the tire temperature delta (i.e., the change in tire temperature) is above 20% over 5 minutes, the threshold bands (i.e., different ranges of each alert thresholds) are reduced, at 902, by 20% to predict and prevent the potential failure or breakdown in the future.

For high tire temperature 910: a temperature between 200 and 300° F. 912 generates warning severity 1 (922); a temperature between 300 and 500° F. 914 generates warning severity 3 (924); a temperature greater than 500° F. 916 generates warning severity 5 (926); and a temperature greater than 850° F. 918 generates a combustion warning (928).

Figure 10:
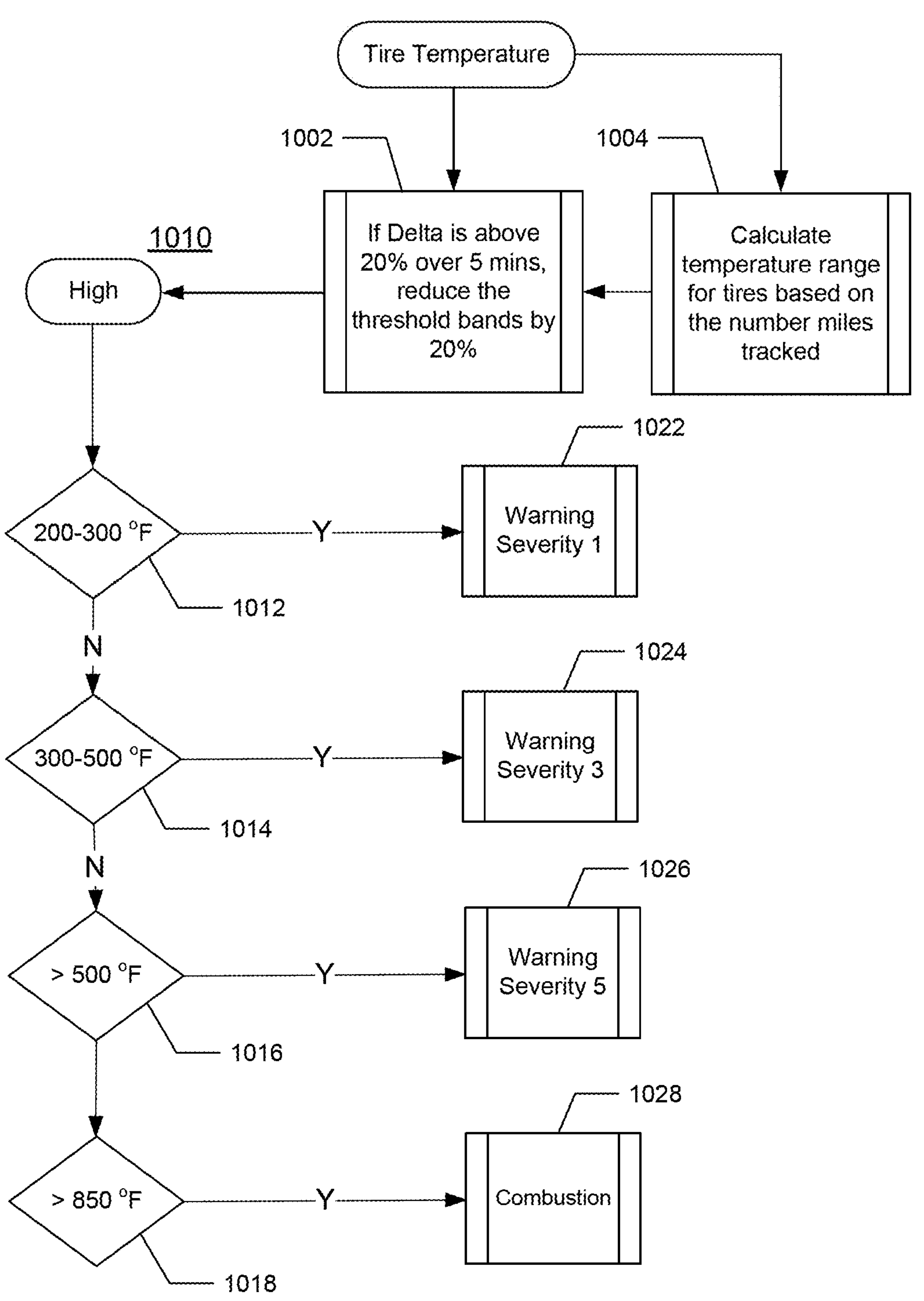
FIG. 10 is a flow diagram of a level 4 tire temperature monitoring process in accordance with one implementation of the present disclosure.

FIG. 10 is a flow diagram of a level 4 tire temperature monitoring process 1000 in accordance with one implementation of the present disclosure. In the illustrated implementation of FIG. 10, the tire temperature is monitored for high tire temperature 1010. If the tire temperature delta (i.e., the change in tire temperature) is above 20% over 5 minutes, the threshold bands (i.e., different ranges of each alert thresholds) are reduced, at 1002, by 20% to predict and prevent the potential failure or breakdown in the future. Further, a range for the tire temperature is calculated, at 1004, based on the number of miles tracked. Thus, by looking at the past recorded tire operating temperature range, the trend of the tire temperature range increasing or decreasing may be observed. Based on the observation, the alert thresholds may be adjusted predict and prevent the potential failure or breakdown in the future.

For high tire temperature 1010: a temperature between 200 and 300° F. 1012 generates warning severity 1 (1022); a temperature between 300 and 500° F. 1014 generates warning severity 3 (1024); a temperature greater than 500° F. 1016 generates warning severity 5 (1026); and a temperature greater than 850° F. 1018 generates a combustion warning (1028).

Figure 11:
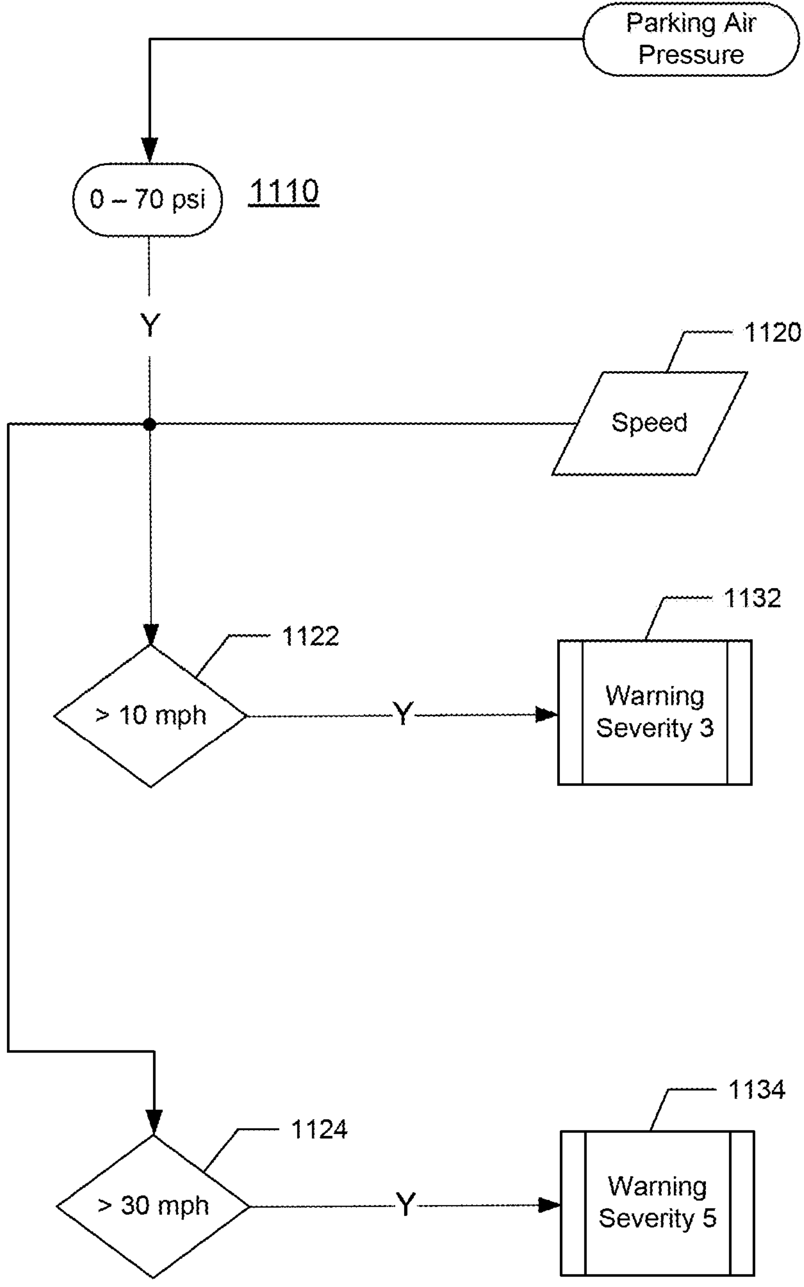
FIG. 11 is a flow diagram of levels 2 through 4 parking air pressure monitoring process in accordance with one implementation of the present disclosure.

FIG. 11 is a flow diagram of levels 2 through 4 parking air pressure monitoring process 1100 in accordance with one implementation of the present disclosure. Since trailer brakes are pneumatically operated (i.e., operated with air pressure), the parking brake is engaged when no air is being supplied to the brake. When the air pressure is less than 70 psi, the parking brake is considered to be engaged and the vehicle should not be moving. When air is being supplied with more than a certain amount of air pressure (e.g., over 70 psi, although this may vary depending on the brake chamber manufacturer), the parking brake is disengaged.

In the illustrated implementation of FIG. 11, the parking air pressure is monitored for speed 1120 when the parking air pressure is between 0 to 70 psi 1110. For the parking air pressure between 0 to 70 psi 1110: a speed greater than 10 miles/hour (mph) 1122 generates warning severity 3 (1132); and a speed greater than 30 mph 1124 generates warning severity 5 (1134).

Figure 12:
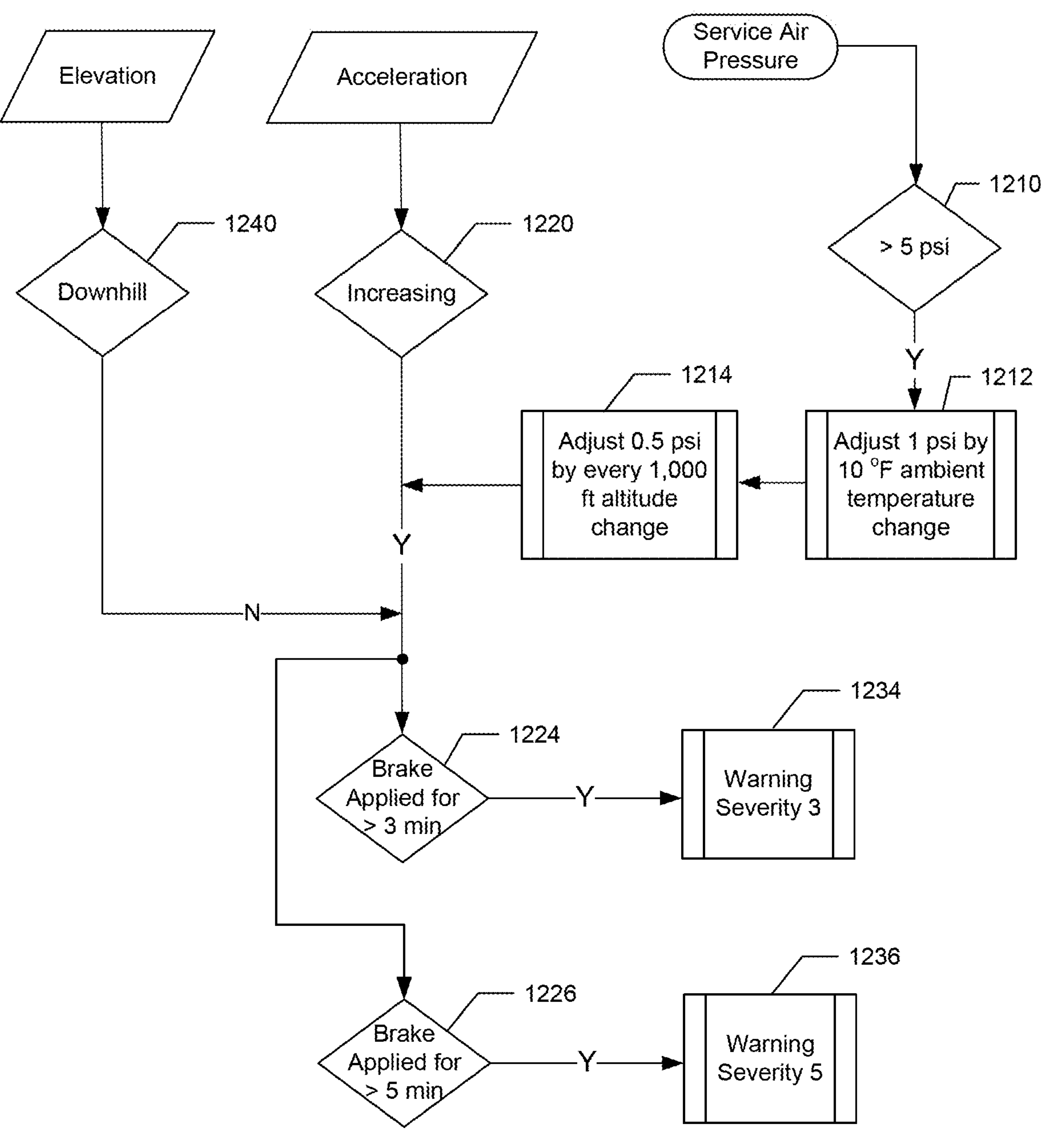
FIG. 12 is a flow diagram of levels 3 and 4 service air pressure monitoring process in accordance with one implementation of the present disclosure.

FIG. 12 is a flow diagram of levels 3 and 4 service air pressure monitoring process 1200 in accordance with one implementation of the present disclosure. The service or foot brakes are also pneumatically operated (i.e., operated with air pressure). Thus, the amount and duration of the foot-brake pedal pressed is equal to the amount and duration of the brakes applied in the braking mechanism of the trailer. By monitoring the amount and duration of the foot-brake pedal pressed, the braking habit of the driver and/or the brake system malfunction may be monitored and provide necessary warnings. For example, if a trailer is traveling on a flat road at steady speed but the service brake air pressure is more than 0 psi, it may result in increase in the brake temperature and cause fire and/or other failures.

In the illustrated implementation of FIG. 12, the service air pressure is monitored for acceleration increasing 1220 and elevation not being downhill 1240, when the service air pressure is greater than 5 psi 1210. The service air pressure is adjusted 1 psi, at 1212, by every 10° F. change in ambient temperature, while the service air pressure is adjusted 0.5 psi, at 1214, by every 1,000 feet of change in altitude.

For the service air pressure greater than 5 psi 1210: an acceleration increasing 1220 and the duration of the brake being applied for more than 3 minutes 1224 generates warning severity 3 (1234); and an acceleration increasing 1220 and the duration of the brake being applied for more than 5 minutes 1226 generates warning severity 5 (1236).

Figure 13:
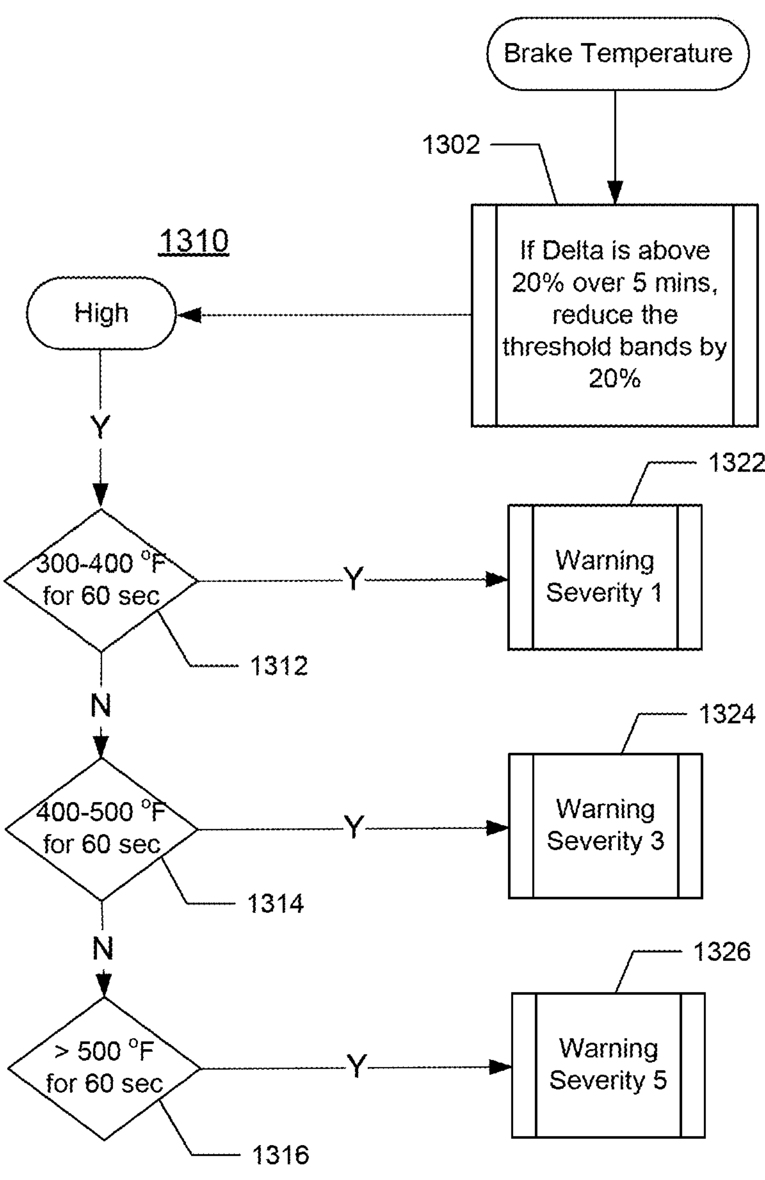
FIG. 13 is a flow diagram of levels 2 through 4 brake lining temperature monitoring process in accordance with one implementation of the present disclosure.

FIG. 13 is a flow diagram of levels 2 through 4 brake temperature monitoring process 1300 in accordance with one implementation of the present disclosure. In the illustrated implementation of FIG. 13, the brake temperature is monitored for high temperature 1310. If the brake temperature delta is above 20% over 5 minutes, the threshold bands are reduced, at 1302, by 20% to predict and prevent the potential failure or breakdown in the future.

For high brake lining temperature 1310: a temperature between 300 and 400° F. for 60 minutes 1312 generates warning severity 1 (1322); a temperature between 400 and 500° F. for 60 minutes 1314 generates warning severity 3 (1324); and a temperature greater than 500° F. for 60 minutes 1316 generates warning severity 5 (1326).

Figure 14A:
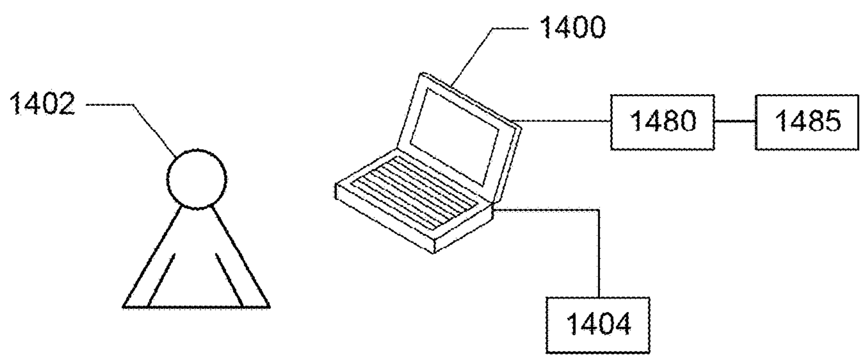
FIG. 14A is a representation of a computer system and a user in accordance with an implementation of the present disclosure.

FIG. 14A is a representation of a computer system 1400 and a user 1402 in accordance with an implementation of the present disclosure. The user 1402 uses the computer system 1400 to implement an application 1490 for monitoring critical areas for thermal events as illustrated and described with respect to the methods 400 to 1300 for monitoring critical areas for thermal events in FIGS. 4 to 13.

Figure 14B:
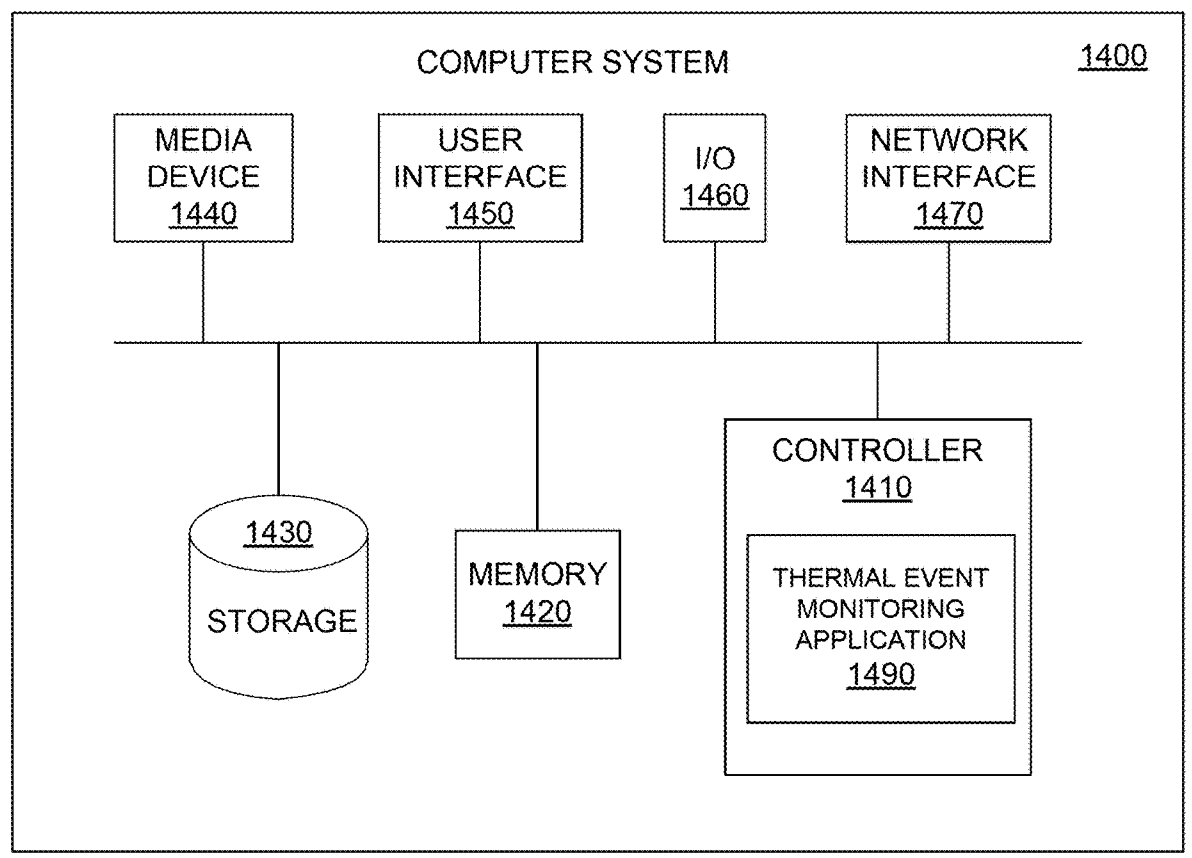
FIG. 14B is a functional block diagram illustrating the computer system hosting the thermal event monitoring application in accordance with an implementation of the present disclosure.

The computer system 1400 stores and executes the thermal event monitoring application 1490 of FIG. 14B. In addition, the computer system 1400 may be in communication with a software program 1404. Software program 1404 may include the software code for the thermal event monitoring application 1490. Software program 1404 may be loaded on an external medium such as a CD, DVD, or a storage drive, as will be explained further below.

Furthermore, the computer system 1400 may be connected to a network 1480. The network 1480 can be connected in various different architectures, for example, client-server architecture, a Peer-to-Peer network architecture, or other type of architectures. For example, network 1480 can be in communication with a server 1485 that coordinates engines and data used within the thermal event monitoring application 1490. Further, the server 1485 may include a server in the headquarter 232 configured to receive the sensor data and the alerts and warnings and deliver replacement parts to the site to minimize downtime of the trailer. Also, the network can be different types of networks. For example, the network 1480 can be the Internet, a Local Area Network or any variations of Local Area Network, a Wide Area Network, a Metropolitan Area Network, an Intranet or Extranet, or a wireless network.

FIG. 14B is a functional block diagram illustrating the computer system 1400 hosting the thermal event monitoring application 1490 in accordance with an implementation of the present disclosure. A controller 1410 is a programmable processor and controls the operation of the computer system 1400 and its components. The controller 1410 loads instructions (e.g., in the form of a computer program) from the memory 1420 or an embedded controller memory (not shown) and executes these instructions to control the system, such as to provide the data processing. In its execution, the controller 1410 provides the thermal event monitoring application 1490 with a software system. Alternatively, this service can be implemented as separate hardware components in the controller 1410 or the computer system 1400.

Memory 1420 stores data temporarily for use by the other components of the computer system 1400. In one implementation, memory 1420 is implemented as RAM. In one implementation, memory 1420 also includes long-term or permanent memory, such as flash memory and/or ROM.

Storage 1430 stores data either temporarily or for long periods of time for use by the other components of the computer system 1400. For example, storage 1430 stores data used by the thermal event monitoring application 1490. In one implementation, storage 1430 is a hard disk drive.

The media device 1440 receives removable media and reads and/or writes data to the inserted media. In one implementation, for example, the media device 1440 is an optical disc drive.

The user interface 1450 includes components for accepting user input from the user of the computer system 1400 and presenting information to the user 1402. In one implementation, the user interface 1450 includes a keyboard, a mouse, audio speakers, and a display. The controller 1410 uses input from the user 1402 to adjust the operation of the computer system 1400.

The I/O interface 1460 includes one or more I/O ports to connect to corresponding I/O devices, such as external storage or supplemental devices (e.g., a printer or a PDA). In one implementation, the ports of the I/O interface 1460 include ports such as: USB ports, PCMCIA ports, serial ports, and/or parallel ports. In another implementation, the I/O interface 1460 includes a wireless interface for communication with external devices wirelessly.

The network interface 1470 includes a wired and/or wireless network connection, such as an RJ-45 or "Wi-Fi" interface (including, but not limited to 802.11) supporting an Ethernet connection.

The computer system 1400 includes additional hardware and software typical of computer systems (e.g., power, cooling, operating system), though these components are not specifically shown in FIG. 14B for simplicity. In other implementations, different configurations of the computer system can be used (e.g., different bus or storage configurations or a multi-processor configuration).

In one particular implementation, a method for monitoring a tire pressure of a trailer and issuing a severity warning is disclosed. The method includes: monitoring the tire pressure for a first low pressure band and a first high pressure band, wherein the first high pressure band is higher than the first low pressure band; issuing a first severity warning when the tire pressure is within the first low pressure band or the first high pressure band; monitoring the tire pressure for a second low pressure band and a second high pressure band, wherein the second low pressure band is lower than the first low pressure band, and the second high pressure band is higher than the first high pressure band; issuing a second severity warning when the tire pressure is within the second low pressure band or the second high pressure band; monitoring the tire pressure for a third low pressure band and a third high pressure band, wherein the third low pressure band is lower than the second low pressure band, and the third high pressure band is higher than the second high pressure band; and issuing a third severity warning when the tire pressure is within the third low pressure band or the third high pressure band.

In one implementation, the method further includes increasing an alert level of the severity warning by one, every hour, when the monitored tire pressure indicates continuous decrease over time. In one implementation, the method further includes increasing an alert level of the severity warning by one, every hour, when the monitored tire pressure indicates continuous increase over time. In one implementation, the method further includes increasing or decreasing the tire pressure by one psi for corresponding increase or decrease of 10° F. in ambient temperature. In one implementation, the method further includes increasing or decreasing the tire pressure by 0.5 psi for corresponding increase or decrease of 1,000 feet in altitude. In one implementation, the method further includes comparing the tire pressure with an average tire pressure of a set number of trips previously taken by the trailer. In one implementation, the method further includes comparing the tire pressure with an average tire pressure of a set number of trips previously taken by a same or similarly-configured trailer.

In another particular implementation, a method for monitoring a tire temperature of a trailer is disclosed. The method includes: monitoring the tire temperature for a first high temperature band and issuing a first severity warning when the tire temperature is within the first high temperature band; monitoring the tire temperature for a second high temperature band and issuing a second severity warning when the tire temperature is within the second high temperature band, wherein the second high temperature band is higher than the first high temperature band; monitoring the tire temperature for a third high temperature band and issuing a third severity warning when the tire temperature is within the third high temperature band, wherein the third high temperature band is higher than the second high temperature band; and monitoring the tire temperature for a fourth high temperature and issuing a fourth severity warning when the tire temperature is higher than the fourth high temperature, wherein the fourth high temperature is higher than the third high temperature band.

In one implementation, the method further includes reducing threshold bands by 20%, when change in the tire temperature is above 20% over 5 minutes. In one implementation, the method further includes calculating a range for the tire temperature based on a number of miles tracked.

In yet another particular implementation, a method for monitoring a brake temperature of a trailer is disclosed. The method includes: monitoring the brake temperature for a first high temperature band and issuing a first severity warning when the brake temperature is within the first high temperature band for at least 60 seconds; monitoring the brake temperature for a second high temperature band and issuing a second severity warning when the brake temperature is within the second high temperature band for at least 60 seconds, wherein the second high temperature band is higher than the first high temperature band; and monitoring the brake temperature for a third high temperature and issuing a third severity warning when the brake temperature is higher than the third high temperature for at least 60 seconds, wherein the third high temperature is higher than the second high temperature band.

In one implementation, the method further includes reducing threshold bands by 20%, when change in the brake temperature is above 20% over 5 minutes.

The description herein of the disclosed implementations is provided to enable any person skilled in the art to make or use the present disclosure. Numerous modifications to these implementations would be readily apparent to those skilled in the art, and the principals defined herein can be applied to other implementations without departing from the spirit or scope of the present disclosure. For example, although monitoring the critical parameters includes measuring and monitoring temperature and air pressure, other parameters including vibration, speed, GPS location, altitude using wire and/or wireless data transmission technologies may be measured and monitored.

All features of each of the above-discussed examples are not necessarily required in a particular implementation of the present disclosure. Further, it is to be understood that the description and drawings presented herein are representative of the subject matter which is broadly contemplated by the present disclosure. It is further understood that the scope of the present disclosure fully encompasses other implementations that may become obvious to those skilled in the art and that the scope of the present disclosure is accordingly limited by nothing other than the appended claims.

The invention claimed is:

1. A method for monitoring a tire pressure of a trailer and issuing a severity warning, the method comprising:

monitoring the tire pressure for a first low pressure band and a first high pressure band, wherein the first high pressure band is higher than the first low pressure band;

issuing a first severity warning when the tire pressure is within the first low pressure band or the first high pressure band;

monitoring the tire pressure for a second low pressure band and a second high pressure band, wherein the second low pressure band is lower than the first low pressure band, and the second high pressure band is higher than the first high pressure band;

issuing a second severity warning when the tire pressure is within the second low pressure band or the second high pressure band;

monitoring the tire pressure for a third low pressure band and a third high pressure band, wherein the third low pressure band is lower than the second low pressure band, and the third high pressure band is higher than the second high pressure band;

issuing a third severity warning when the tire pressure is within the third low pressure band or the third high pressure band; and comparing the tire pressure with an average tire pressure of a set number of trips previously taken by the trailer.

2. The method of claim 1, further comprising
increasing an alert level of the severity warning by one, every hour, when the monitored tire pressure indicates continuous decrease over time.

3. The method of claim 1, further comprising
increasing an alert level of the severity warning by one, every hour, when the monitored tire pressure indicates continuous increase over time.

4. The method of claim 1, further comprising
increasing or decreasing the tire pressure by one psi for corresponding increase or decrease of 10° F. in ambient temperature.

5. The method of claim 1, further comprising
increasing or decreasing the tire pressure by 0.5 psi for corresponding increase or decrease of 1,000 feet in altitude.

6. A method for monitoring a tire pressure of a trailer, the method comprising:
monitoring the tire pressure for a first low pressure band and a first high pressure band, wherein the first high pressure band is higher than the first low pressure band;
issuing a first severity warning when the tire pressure is within the first low pressure band or the first high pressure band;
monitoring the tire pressure for a second low pressure band and a second high pressure band, wherein the second low pressure band is lower than the first low pressure band, and the second high pressure band is higher than the first high pressure band;
issuing a second severity warning when the tire pressure is within the second low pressure band or the second high pressure band;
monitoring the tire pressure for a third low pressure band and a third high pressure band, wherein the third low pressure band is lower than the second low pressure band, and the third high pressure band is higher than the second high pressure band;
issuing a third severity warning when the tire pressure is within the third low pressure band or the third high pressure band; and
comparing the tire pressure with an average tire pressure of a set number of trips previously taken by a same or similarly-configured trailer.

7. The method of claim 6, further comprising
increasing an alert level of the severity warning by one, every hour, when the monitored tire pressure indicates continuous decrease over time.

8. The method of claim 6, further comprising
increasing an alert level of the severity warning by one, every hour, when the monitored tire pressure indicates continuous increase over time.

9. The method of claim 6, further comprising
increasing or decreasing the tire pressure by one psi for corresponding increase or decrease of 10° F. in ambient temperature.

10. The method of claim 6, further comprising
increasing or decreasing the tire pressure by 0.5 psi for corresponding increase or decrease of 1,000 feet in altitude.

* * * * *